United States Patent
Toyoda

(10) Patent No.: US 8,228,612 B2
(45) Date of Patent: Jul. 24, 2012

(54) ZOOM LENS AND IMAGE PICKUP APPARATUS

(75) Inventor: Koji Toyoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/137,137

(22) Filed: Jul. 22, 2011

(65) Prior Publication Data

US 2011/0279907 A1 Nov. 17, 2011

Related U.S. Application Data

(62) Division of application No. 12/292,911, filed on Dec. 1, 2008, now Pat. No. 7,986,458.

(30) Foreign Application Priority Data

Dec. 26, 2007 (JP) ................................. 2007-334754
Feb. 18, 2008 (JP) ................................. 2008-036038

(51) Int. Cl.
 *G02B 15/14* (2006.01)
(52) U.S. Cl. ....................................... 359/676; 359/557
(58) Field of Classification Search .......... 359/676–690, 359/554–557
See application file for complete search history.

(56) References Cited

U.S. PATENT DOCUMENTS

| 6,924,938 | B2 * | 8/2005 | Nishina et al. ................ 359/687 |
| 7,289,281 | B1 | 10/2007 | Sugita |
| 2005/0036207 | A1 | 2/2005 | Yamasaki et al. |
| 2007/0188887 | A1 | 8/2007 | Ohtake |
| 2008/0123191 | A1 | 5/2008 | Suzaki et al. |
| 2008/0212184 | A1 | 9/2008 | Ohtake |

FOREIGN PATENT DOCUMENTS

| JP | 2003-228001 A | 8/2003 |
| JP | 2006-023593 | 1/2006 |

* cited by examiner

*Primary Examiner* — Thong Nguyen
(74) *Attorney, Agent, or Firm* — Rader Fishman & Grauer, PLLC

(57) ABSTRACT

A zoom lens and an image pickup apparatus are disclosed. The zoom lens includes, in order from an object side to an image side, a first lens group having a positive refractive power, a second lens group having a negative refractive power, a third lens group having a positive refractive power, a fourth lens group having a positive refractive power, and a fifth lens group having a positive refractive power. The fifth lens group includes a fixed group having a negative refractive power, and a movable group having a positive refractive power and being movable in a direction substantially orthogonal to the optical axis. The image formed on an image surface is movable in a direction substantially orthogonal to the optical axis by moving the movable group of the fifth lens group in the direction substantially orthogonal to the optical axis. The fifth lens group is satisfied predetermined conditions.

4 Claims, 13 Drawing Sheets

ZOOM LENS AND IMAGE PICKUP APPARATUS

CROSS-REFERENCE TO RELATED APPLICATIONS

The present application is a Divisional application of application Ser. No. 12/292,911, filed Dec. 1, 2008 now U.S. Pat. No. 7,986,458, which claims benefit of priority of Japanese patent Applications No. 2007-334754 filed in the Japanese Patent Office on Dec. 26, 2007, and No. 2008-36038 filed in the Japanese Patent Office on Feb. 18, 2008, the entire disclosures of which are incorporated herein by reference.

BACKGROUND OF THE INVENTION

1. Field of the Invention

The present invention relates to a zoom lens and an image pickup apparatus. More particularly, the invention relates to a zoom lens and an image pickup apparatus each having a small size, high image quality, and high zoom ratio.

2. Description of Related Art

Recently, small-sized image pickup apparatuses such as video cameras and digital video cameras for consumer use have also been widely available for home use.

For these small-sized image pickup apparatuses, the demand for small size enhancing portability, high image quality, high zoom ratio, and the like is increased. Similarly, a photo-taking lens mounted on an image pickup apparatus, particularly a zoom lens, are required to satisfy the miniaturization by reducing the entire length and depth, and the improvement of lens performance.

There have also recently been strong demands in optical camera-shake correction. The design difficulty to satisfy the requirement of the optical camera-shake correction in addition to the miniaturization, high image quality and high zoom ratio has also become increasingly higher.

Under these circumstances, some of known zoom lenses are configured to arrange, in an order from the object side to the image side, a first lens group having a positive refractive power, a second lens group having a negative refractive power, a third lens group having a positive refractive power, a fourth lens group having a negative refractive power, and a fifth lens group having a positive refractive power. The third lens group includes a lens having a positive refractive power and a lens having a negative refractive power. In order to correct image variations during camera-shake, the third lens group is movable in a direction substantially orthogonal to an optical axis direction (for example, refer to Japanese Unexamined Patent Application Publication No. 2003-228001 (Patent Document 1)).

The zoom lens described in the Patent Document 1 provides, for example, a zoom lens for a video camera capable of performing optical camera-shake correction by the configuration described above.

On the other hand, some of known zoom lenses are configured to arrange, in order from the object side to the image side, a first lens group having a positive refractive power, a second lens group having a negative refractive power, a third lens group having a positive refractive power, a fourth lens group having a positive refractive power, and a fifth lens group having a positive refractive power. The fifth lens group includes a positive sub lens group having a positive refractive power and a negative sub lens group having a negative refractive power. In these zoom lenses, the image is shifted to permit camera-shake correction by employing the positive sub lens group which is movable in a direction substantially orthogonal to an optical axis (for example, refer to Japanese Unexamined Patent Application Publication No. 2006-23593 (Patent Document 2)).

In the known zoom lenses as described in the Patent Documents 1 and 2, it is designed particularly on the telephoto side so that a part of the lens groups constituting the zoom lens, for mainly correcting the image blur due to camera-shake, is movable in the direction substantially orthogonal to the optical axis so as to achieve high quality image and optical performance improvement. Further, the lens configuration is determined to meet the desired optical performance while ensuring small size and high zoom ratio.

Thus, in the known zoom lenses as described in the Patent Documents 1 and 2, owing to the lens configuration consisting of the five lens groups, the optical camera-shake correcting function can be ensured to meet the desired superior optical performance, while achieving high zoom ratio and high image quality.

However, in the known zoom lenses described above, particularly the mounting of the optical camera-shake correcting function increases the size of the camera-shake correcting mechanism. This cannot be disregarded for reducing the size of the image pickup apparatus including the mechanism thereof, thereby causing the following issues.

That is, in the zoom lens described in the Patent Document 1, the third lens group can be movable in the direction substantially orthogonal to the optical axis direction in order to correct the image variations during camera-shake. The third lens group has a tendency that a light flux diameter becomes larger than the lens groups other than the first lens group. This extremely increases the effective diameter on the lens surface covering the camera-shake correction, which leads to a large apparatus.

The third lens group exists at substantially the center of the optical axis in the zoom lens and has strong refractive power. Therefore, when the third lens group is moved in the direction orthogonal to the optical axis direction, these other lens groups produce wide fluctuations of light flux position, thereby increasing the effective diameter on the lens surfaces constituting these other lens groups, which results in a large image pickup apparatus.

The zoom lens described in the Patent Document 2 can perform camera-shake correction by shifting the image under the configurations that the fifth lens group is composed of the positive sub lens group having the positive refractive power and the negative sub lens group having the negative refractive power, and that the positive sub lens group is movable in the direction substantially orthogonal to the optical axis direction. However, the application of the camera-shake correcting mechanism to the object-side lens group (the positive sub lens group) of the fifth lens group necessitates space for arranging the camera-shake correcting mechanism on both sides in the optical axis direction of the positive sub lens group, and the size of the image pickup apparatus is correspondingly increased.

The optical design is limited to ensure the space on both sides in the optical axis direction in the positive sub lens group. This might cause image quality degradation.

Further in the zoom lens described in the Patent Document 2, the cemented lens system is formed in the image-side lens configuration of the second lens group and the succeeding ones. Particularly in terms of optical performances such as chromatic aberration and resolution on the wide-angle end, various aberrations are not sufficiently corrected from the viewpoint of the optical performances to ensure superior high vision image quality. Therefore, various aberrations such as on-axis color aberration and magnification color aberration remain, thereby exerting adverse effect on image quality.

The above-mentioned issues are aggravated by ensuring high zoom ratio and high image quality, and remain unresolved from the viewpoint of realizing a small-sized and high zoom ratio zoom lens.

Accordingly, it is desirable to provide a zoom lens and an image pickup apparatus capable of achieving miniaturization, high image quality, and high zoom ratio.

SUMMARY OF THE INVENTION

A zoom lens comprises, in order from an object side to an image side: a first lens group having a positive refractive power and including lens components which are fixed to each other, a second lens group having a negative refractive power and being movable in an optical axis direction to perform at least a zooming, a third lens group having a positive refractive power and being fixed, a fourth lens group having a positive refractive power and being movable in the optical axis direction to perform focal position correction and focusing by performing a zooming, and a fifth lens group having a positive refractive power. An aperture stop is arranged at a position of between the image side than of the second lens group and at a position of the object side than of the fifth lens group. At least one of the lens groups lens group selected from the group consisting of the third lens group and the fourth lens group is positioned between the image side of the aperture stop and the object side of the fifth lens group at the image side than the aperture stop and includes a three-element cemented lens composed of three lenses cemented together. The zoom lens is configured to satisfy the following conditional expressions (5) and (6):

$$fm<0 \qquad (5)$$

$$vm<30 \qquad (6)$$

where fm is the focal length of a middle lens in the three-element cemented lens, and vm is the Abbe number of the middle lens of the three-element cemented lens. And the three-element cemented lens is configured to satisfy the following conditional expression (7):

$$fs<0 \qquad (7)$$

where fs is the focal length of the three-element cemented lens.

Another zoom lens comprises, in order from an object side to an image side: a first lens group having a positive refractive power and including lens components which fixed to each other, a second lens group having a negative refractive power and being movable in an optical axis direction to perform at least a zooming, a third lens group having a positive refractive power and including lens components which are fixed to each other, a fourth lens group having a positive refractive power and being movable in the optical axis direction to perform focal position correction and focusing by performing a zooming, and a fifth lens group having a positive refractive power. The fifth lens group includes a three-element cemented lens having a negative refractive power and a lens group having a positive refractive power. The zoom lens is configured to satisfy the following conditional expressions (5) and (6):

$$fm<0 \qquad (5)$$

$$vm<30 \qquad (6)$$

where fm is the focal length of a middle lens in the three-element cemented lens, and vm is the Abbe number of the middle lens of the three-element cemented lens.

An image pickup apparatus including a zoom lens and an image pickup element for converting an optical image formed by the zoom lens into electrical signals. The image pickup apparatus comprises the zoom lens having a first lens group having a positive refractive power and including lens components which are fixed to each other, a second lens group having a negative refractive power and being movable in an optical axis direction to perform at least zooming, a third lens group having a positive refractive power and lens components which are fixed to each other, a fourth lens group having a positive refractive power and being movable in the optical axis direction to perform focal position correction and focusing by performing a zooming, and a fifth lens group having a positive refractive power, the first to the fifth lens groups being arranged in the order from an object side to an image side. The fifth lens group includes a three-element cemented lens having a negative refractive power and a lens group having a positive refractive power. And the zoom lens is configured to satisfy the following conditional expressions (5) and (6):

$$fm<0 \qquad (5)$$

$$vm<30 \qquad (6)$$

where fm is the focal length of a middle lens in the three-element cemented lens, and vm is the Abbe number of the middle lens of the three-element cemented lens.

Another zoom lens comprises, in order from an object side to an image side a first lens group having a positive refractive power and including lens components that are fixed to each other, a second lens group having a negative refractive power and being movable in an optical axis direction to perform at least a zooming, a third lens group having a positive refractive power and being fixed, a fourth lens group having a positive refractive power and being movable in the optical axis direction to perform focal position correction and focusing by performing a zooming, a fifth lens group having a positive refractive power, and an aperture stop arranged at a position between the image side of the third lens group and the object side of the fifth lens group. The fourth lens group includes a three-element cemented lens composed of three lenses cemented together. The zoom lens is configured to satisfy the following conditional expressions (5) and (6):

$$fm<0 \qquad (5)$$

$$vm<30 \qquad (6)$$

where fm is the focal length of a middle lens in the three-element cemented lens, and vm is the Abbe number of the middle lens of the three-element cemented lens.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Figure 1:
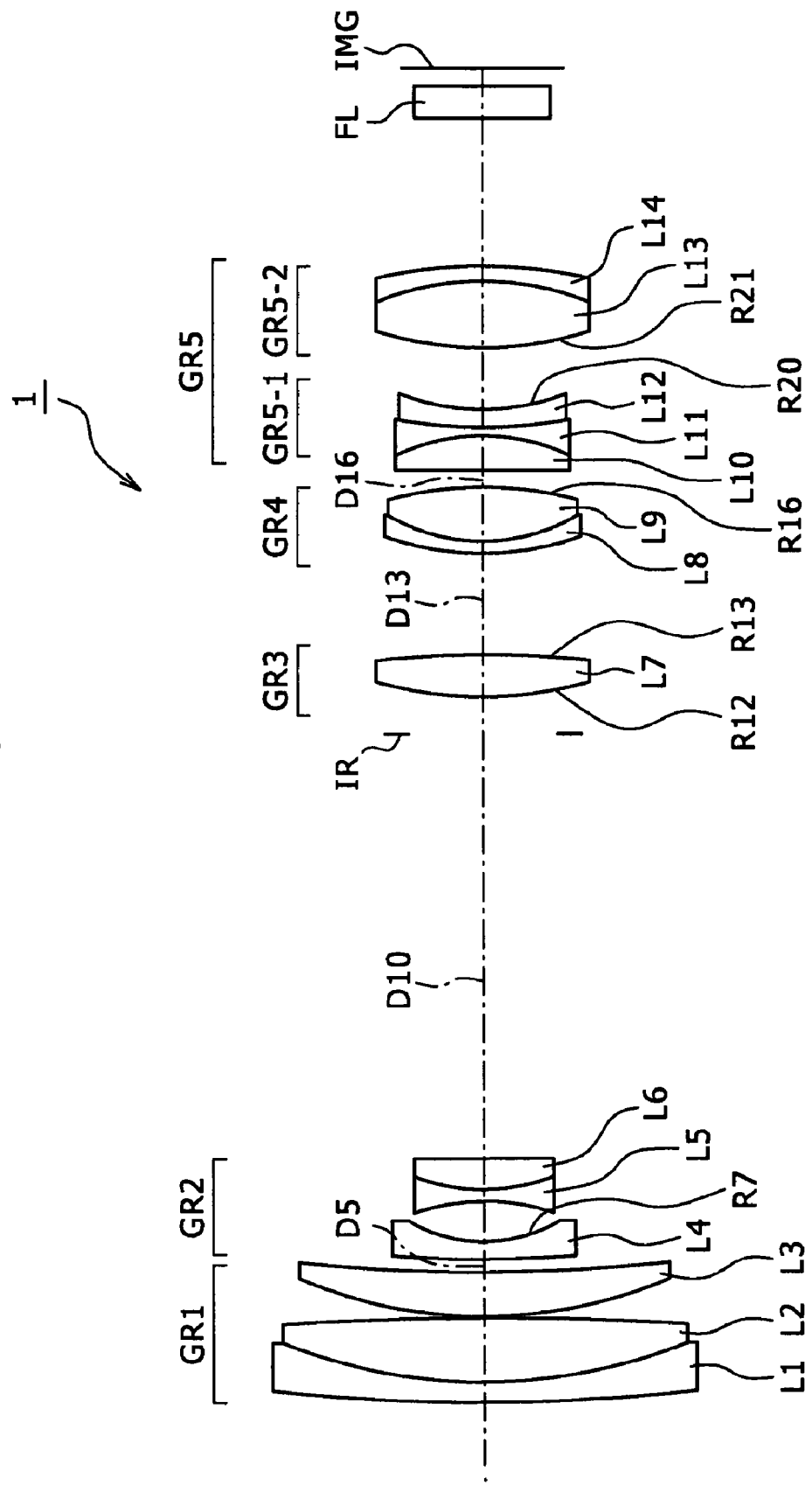
FIG. 1 shows, together with FIGS. 2 to 13, embodiments of an image pickup apparatus and a zoom lens, particularly showing the lens configuration according to a first embodiment of the zoom lens according to an embodiment of the present invention.

Embodiments of the zoom lens and the image pickup apparatus according to the invention will be described below with reference to the accompanying drawings.

The zoom lens according to the invention will first be described.

In accordance with an embodiment of the present invention, there is provided a zoom lens including, in order from an object side to an image side, a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a fixed group having a negative refractive power and being fixed, and a movable group having a positive refractive power and being movable in a direction substantially orthogonal to the optical axis. The fixed group and the movable group are arranged in the order from the object side to the image side. The image formed on an image surface is movable in a direction substantially orthogonal to the optical axis by moving the movable group of the fifth lens group in the direction substantially orthogonal to the optical axis. The zoom lens is configured to satisfy the following conditional expressions (1) and (2):

$$0.6 < |f51/f52| < 1.0 \qquad (1)$$

$$0.2 < fw/f52 < 0.5 \qquad (2)$$

where f51 is the focal length of the fixed group of the fifth lens group, f52 is the focal length of the movable group of the fifth lens group, and fw is the focal length of the entire lens system at a wide-angle end.

In the zoom lens according to an embodiment of the present invention, variations of aberrations such as spherical aberration, astigmatism, and distortion during camera-shake correction can be suppressed.

In accordance with an embodiment of the present invention, there is provided an image pickup apparatus including a zoom lens and an image pickup element for converting an optical image formed by the zoom lens into electrical signals. The zoom lens includes, in order from an object side to an image side, a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a fixed group having a negative refractive power and being fixed, and a movable group having a positive refractive power and being movable in a direction substantially orthogonal to the optical axis. The fixed group and the movable group are arranged in the order from the object side to the image side. The image formed on an image surface is movable in a direction substantially orthogonal to the optical axis by moving the movable group of the fifth lens group in the direction substantially orthogonal to the optical axis. The zoom lens is configured to satisfy the following conditional expressions (1) and (2):

$$0.6 < |f51/f52| < 1.0 \qquad (1)$$

$$0.2 < fw/f52 < 0.5 \qquad (2)$$

where f51 is the focal length of the fixed group of the fifth lens group, f52 is the focal length of the movable group of the fifth lens group, and fw is the focal length of the entire lens system at a wide-angle end.

In the image pickup apparatus according to an embodiment of the present invention, variations of aberrations such as spherical aberration, astigmatism, and distortion during camera-shake correction can be suppressed.

In the zoom lens or the image pickup apparatus, the movable group of the fifth lens group may be configured to satisfy the following conditional expression (3):

$$2.0 < ft/f52 < 5.0 \qquad (3)$$

where ft is the focal length of the entire lens system at a telephoto end.

The satisfaction of the conditional expression (3) enables to suppress the leaning of astigmatism and the degradation of optical performance on the telephoto end.

Further, in the zoom lens and the image pickup apparatus described above, the fifth lens group may be configured to satisfy the following conditional expression (4):

$$fi < f5 \qquad (4)$$

where fi is the focal length of the i-th lens group (i is 1 to 4), and f5 is the focal length of the fifth lens group.

The satisfaction of the conditional expression (4) enables to suppress the degradation of comatic aberration and the degradation of resolution.

Furthermore, in the zoom lens and the image pickup apparatus, at least one surface of the fifth lens group may be formed of an aspherical surface. This enables optical performance improvement both in the wide-angle end and the telephoto end.

Still furthermore, in the zoom lens and the image pickup apparatus, the fixed group of the fifth lens group may be formed by a cemented lens composed of a first lens having a positive refractive power, a second lens having a negative refractive power, and a third lens having a negative refractive power cemented together in the order from the object side to the image side. This enables suppression of the occurrence of chromatic aberration on the wide-angle end, thereby improving image quality.

Alternatively, in the zoom lens and the image pickup apparatus described above, the movable group of the fifth lens group may be formed by a cemented lens composed of a fourth lens having a positive refractive power and a fifth lens having a negative refractive power cemented together in the order from the object side to the image side. This enables suppression of the occurrence of chromatic aberration on the wide-angle end, thereby improving image quality.

In the zoom lens and the image pickup apparatus described above, an aperture stop may be arranged at a position of the image side than the second lens group and at a position of the object side than the fifth lens group, and at least one of the lens groups positioned at the image side than the aperture stop may include a three-element cemented lens composed of three lenses cemented together, and the zoom lens may be configured to satisfy the following conditional expressions (5) and (6):

$$fm<0 \tag{5}$$

$$vm<30 \tag{6}$$

where fm is the focal length of a middle lens in the three-element cemented lens, and vm is the Abbe number of the middle lens of the three-element cemented lens.

The satisfaction of the conditional expressions (5) and (6) enables suitable corrections of various aberrations such as spherical aberration, comatic aberration, and chromatic aberration.

Further, the three-element cemented lens may satisfy the following conditional expression (7):

$$fs<0 \tag{7}$$

where fs is the focal length of the three-element cemented lens.

The satisfaction of the conditional expression (7) enables suitable corrections of various aberrations such as spherical aberration and comatic aberration.

Furthermore, in the zoom lens and the image pickup apparatus described above, the three-element cemented lens may be arranged in the fifth lens group. This suppresses particularly the chromatic aberration on the wide-angle end.

Still furthermore, the three-element cemented lens may be formed by a first lens having a positive refractive power, a second lens having a negative refractive lens, and a third lens having a negative refractive power arranged in the order from the object side to the image side. This suppresses particularly the chromatic aberration on the wide-angle end.

Still furthermore, at least one surface of the three-element cemented lens may be formed of an aspherical surface. This particularly enables suitable corrections of spherical aberration and comatic aberration on the wide-angle end.

Still furthermore, the fifth lens group may include a three-element cemented lens having a negative refractive power and a lens group having a positive refractive power, and the zoom lens may be configured to satisfy the following conditional expressions (5) and (6):

$$fm<0 \tag{5}$$

$$vm<30 \tag{6}$$

where fm is the focal length of a middle lens in the three-element cemented lens, and vm is the Abbe number of the middle lens of the three-element cemented lens.

The satisfaction of the conditional expressions (5) and (6) enables suitable corrections of various aberrations such as spherical aberration, comatic aberration, and chromatic aberration.

In accordance with another embodiment of the present invention, there is provided a zoom lens, in order from an object side to an image side, including a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a fixed group having a negative refractive power and being fixed, and a movable group having a positive refractive power and being movable in a direction substantially orthogonal to the optical axis. The fixed group and the movable group are arranged in the order from the object side to the image side. The fixed group of the fifth lens group is formed by a cemented lens composed of a first lens having a positive refractive power, a second lens having a negative refractive power, and a third lens having a negative refractive power cemented together in the order from the object side to the image side. The movable group of the fifth lens group is formed by a cemented lens composed of a fourth lens having a positive refractive power and a fifth lens having a negative refractive power cemented together in the order from the object side to the image side. The image formed on an image surface is movable in a direction substantially orthogonal to the optical axis by moving the movable group of the fifth lens group in the direction substantially orthogonal to the optical axis. The zoom lens is configured to satisfy the following conditional expressions (1) and (2):

$$0.6<|f51/f52|<1.0 \tag{1}$$

$$0.2<fw/f52<0.5 \tag{2}$$

where f51 is the focal length of the fixed group of the fifth lens group, f52 is the focal length of the movable group of the fifth lens group, and fw is the focal length of the entire lens system at a wide-angle end.

In the zoom lens according to another embodiment of the present invention, variations of aberrations such as spherical aberration, astigmatism, and distortion during a camera-shake correction can be suppressed.

In accordance with another embodiment of the present invention, there is provided an image pickup apparatus including a zoom lens and an image pickup element for converting an optical image formed by the zoom lens into electrical signals. The zoom lens, in order from an object side to an image side, includes a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a fixed group having a negative refractive power and being fixed, and a movable group having a positive refractive power and being movable in a direction substantially orthogonal to the optical axis. The fixed group and the movable group are arranged in the order from the object side to the image side. The fixed group of the fifth lens group is formed by a cemented lens composed of a first lens having a positive refractive power, a second lens having a negative refractive power, and a third lens having a negative refractive power cemented together in the order from the object side to the image side. The movable group of the fifth lens group is formed by a cemented lens composed of a fourth lens having a positive refractive power and a fifth lens having a negative refractive power cemented together in the order from the object side to the image side. The image formed on an image surface is movable in a direction substantially orthogonal to the optical axis by moving the movable group of the fifth lens group in the direction substantially orthogonal to the optical axis. The zoom lens is configured to satisfy the following conditional expressions (1) and (2):

$$0.6 < |f51/f52| < 1.0 \quad (1)$$

$$0.2 < fw/f52 < 0.5 \quad (2)$$

where f51 is the focal length of the fixed group of the fifth lens group, f52 is the focal length of the movable group of the fifth lens group, and fw is the focal length of the entire lens system at a wide-angle end.

In the image pickup apparatus according to another embodiment of the present invention, variations of aberrations such as spherical aberration, astigmatism, and distortion during a camera-shake correction can be suppressed.

In the zoom lens or the image pickup apparatus, the movable group of the fifth lens group may be configured to satisfy the following conditional expression (3):

$$2.0 < ft/f52 < 5.0 \quad (3)$$

where ft is the focal length of the entire lens system at a telephoto end.

The satisfaction of the conditional expression (3) enables to suppress the leaning of astigmatism and the degradation of optical performance on the telephoto end.

Further, in the zoom lens or the image pickup apparatus, the fifth lens group may be configured to satisfy the following conditional expression (4):

$$fi < f5 \quad (4)$$

where fi is the focal length of the i-th lens group (i is 1 to 4), and f5 is the focal length of the fifth lens group.

The satisfaction of the conditional expression (4) enables to suppress the degradation of comatic aberration and the degradation of resolution.

Alternatively, at least one surface of the fifth lens group may be formed of an aspherical surface. This enables optical performance improvement both in the wide-angle end and the telephoto end.

In accordance with a further embodiment of the present invention, there is provided a zoom lens including, in order from an object side to an image side, a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. An aperture stop is arranged at a position of the image side than the second lens group and at a position of the object side than the fifth lens group. At least one of the lens groups positioned at the image side than the aperture stop includes a three-element cemented lens composed of three lenses cemented together. The zoom lens is configured to satisfy the following conditional expressions (5) and (6):

$$fm < 0 \quad (5)$$

$$vm < 30 \quad (6)$$

where fm is the focal length of a middle lens in the three-element cemented lens, and vm is the Abbe number of the middle lens of the three-element cemented lens.

In the zoom lens according a further embodiment of the present invention, various aberrations such as spherical aberration, comatic aberration, and chromatic aberration can be suitably corrected.

In accordance with a further embodiment of the present invention, there is provided an image pickup apparatus including a zoom lens and an image pickup element for converting an optical image formed by the zoom lens into electrical signals. The zoom lens includes, in order from an object side to an image side, a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. An aperture stop is arranged at a position of the image side than the second lens group and at a position of the object side than the fifth lens group. At least one of the lens groups positioned at the image side than the aperture stop includes a three-element cemented lens composed of three lenses cemented together. The zoom lens is configured to satisfy the following conditional expressions (5) and (6):

$$fm < 0 \quad (5)$$

$$vm < 30 \quad (6)$$

where fm is the focal length of a middle lens in the three-element cemented lens, and vm is the Abbe number of the middle lens of the three-element cemented lens.

In the image pickup apparatus according to a further embodiment of the present invention, various aberrations such as spherical aberration, comatic aberration and chromatic aberration can be suitably corrected.

In the zoom lens or the image pickup apparatus described above, the three-element cemented lens may satisfy the following conditional expression (7):

$$fs < 0 \quad (7)$$

where fs is the focal length of the three-element cemented lens.

The satisfaction of the conditional expression (7) enables suitable corrections of various aberrations such as spherical aberration, comatic aberration, and chromatic aberration.

Alternatively, in the zoom lens or the image pickup apparatus described above, the three-element cemented lens may be arranged in the fifth lens group. This suppresses particularly the chromatic aberration on the wide-angle end.

Alternatively, in the zoom lens or the image pickup apparatus described above, the three-element cemented lens may be formed by a first lens having a positive refractive power, a second lens having a negative refractive lens, and a third lens having a negative refractive power arranged in the order from the object side to the image side. This suppresses particularly the chromatic aberration on the wide-angle end.

Alternatively, in the zoom lens or the image pickup apparatus described above, at least one surface of the three-element cemented lens may be formed of an aspherical surface. This particularly enables suitable corrections of spherical aberration and comatic aberration on the wide-angle end.

In accordance with yet another embodiment of the present invention, there is provided a zoom lens, in order from an object side to an image side, including a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a three-element cemented lens having a negative refractive power and a lens group having a positive refractive power. The zoom lens is configured to satisfy the following conditional expressions (5) and (6):

$$fm<0 \quad (5)$$

$$vm<30 \quad (6)$$

where fm is the focal length of a middle lens in the three-element cemented lens, and vm is the Abbe number of the middle lens of the three-element cemented lens.

According to the zoom lens by a yet another embodiment of the present invention, various aberrations such as spherical aberration, comatic aberration, and chromatic aberration can be suitably corrected.

In accordance with a yet another embodiment of the present invention, there is provided an image pickup apparatus including a zoom lens and an image pickup element for converting an optical image formed by the zoom lens into electrical signals. The zoom lens, in order from an object side to an image side, includes a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a three-element cemented lens having a negative refractive power and a lens group having a positive refractive power. The zoom lens is configured to satisfy the following conditional expressions (5) and (6):

$$fm<0 \quad (5)$$

$$vm<30 \quad (6)$$

where fm is the focal length of a middle lens in the three-element cemented lens, and vm is the Abbe number of the middle lens of the three-element cemented lens.

According to the image pickup apparatus by a yet another embodiment of the present invention, various aberrations such as spherical aberration, comatic aberration, and chromatic aberration can be suitably corrected.

Alternatively, in the zoom lens or the image pickup apparatus described above, the three-element cemented lens may be formed by a first lens having a positive refractive power, a second lens having a negative refractive lens, and a third lens having a negative refractive power arranged in the order from the object side to the image side. This suppresses particularly the chromatic aberration on the wide-angle end.

Alternatively, in the zoom lens or the image pickup apparatus described above, at least one surface of the three-element cemented lens may be formed of an aspherical surface. This particularly enables suitable corrections of spherical aberration and comatic aberration on the wide-angle end.

Thus, embodiments of the present invention enables suppression of the optical performance degradation, thereby providing zoom lens or image pickup apparatus which has small-sized high image quality and high zoom ratio.

The zoom lens according to an embodiment of the invention includes, in order from a object side to an image side, a first lens group having a positive refractive power and being fixed, a second lens group having a negative refractive power and being movable in an optical axis direction to perform at least a zooming, a third lens group having a positive refractive power and being fixed, a fourth lens group having a positive refractive power and being movable in the optical axis direction to perform a focal position correction and focusing by performing a zooming, and a fifth lens group having a positive refractive power. The fifth lens group includes a fixed group having a negative refractive power and being fixed, and a movable group having a positive refractive power and being movable in a direction substantially orthogonal to the optical axis. The fixed group and the movable group are arranged in order from the object side to the image side. The image formed on an image surface is movable in the direction substantially orthogonal to the optical axis by moving the movable group of the fifth lens group in the direction substantially orthogonal to the optical axis.

As described above, the zoom lens according to an embodiment of the invention is configured to correct the image camera-shaking due to camera-shake or the like by moving the movable group of the fifth lens group in the direction substantially orthogonal to the optical axis.

Thus, in the zoom lens according to an embodiment of the invention, the movable group of the fifth lens group disposed at the most image-side is used for camera-shake correction, and therefore the lens group for camera-shake correction is disposed at a location having a relatively small effective diameter of light flux, thereby making it possible to suppress an increase in the size of a lens barrel.

Since the movable group of the fifth lens group is disposed at the most image-side, the influence due to fluctuations in light flux position in the other lens groups during a camera-shake correction can be minimized to avoid the increase in the size of the lens barrel.

Furthermore, less limitations is imposed on the space ensured on both sides in the optical axis direction of the movable group of the fifth lens group, thereby making it possible to improve the optical performance and reduce the size of the lens barrel.

The zoom lens is configured to satisfy the following conditional expressions (1) and (2).

$$0.6<|f51/f52|<1.0 \quad (1)$$

$$0.2<fw/f52<0.5 \quad (2)$$

where f51 is the focal length of the fixed group of the fifth lens group, f52 is the focal length of the movable group of the fifth lens group, and fw is the focal length of the entire lens system at a wide-angle end.

The conditional expression (1) defines the ratio between the focal length f51 of the fixed group of the fifth lens group and the focal length of the movable group of the fifth lens group, i.e., the range of refractive power ratio.

When the value of |f51/f52| in the conditional expression (1) exceeds an upper limit value, the refractive power of the movable group of the fifth lens group becomes too strong, thereby considerably degrading the optical performance at the time of the camera-shake correction. That is, when the movable group having a strong refractive power is operated to perform the camera-shake correction, comatic aberration is degraded, and the resolution is considerably lowered as the image height is increased. Additionally, when the value of |f51/f52| in the conditional expression (1) exceeds the upper limit value, the distortion is degraded and the image is considerably distorted asymmetrically.

In contrast, when the value of |f51/f52| in the conditional expression (1) exceeds a lower limit value, the refractive power of the fixed group of the fifth lens group becomes too strong, and the function of light flux divergence in the fifth lens group is enhanced to increase the entire length of the entire zoom lens system, thereby increasing the size of the lens barrel.

The conditional expression (2) defines the ratio between the focal length fw of the entire lens system at a wide-angle end and the focal length f52 of the movable group of the fifth lens group, i.e., the range of refractive power ratio.

When the value of fw/f52 in the conditional expression (2) exceeds an upper limit value, the refractive power of the movable group of the fifth lens group becomes too strong, thereby considerably degrading especially the optical performance at the wide-angle end. That is, the spherical aberration on the wide-angle end falls to underside due to excess correction, and comatic aberration is degraded, which causes the degradation of resolution.

In contrast, when the value of fw/f52 in the conditional expression (2) exceeds a lower limit value, the refractive power of the movable group of the fifth lens group becomes too weak, considerably degrading especially the optical performance at the wide-angle end. That is, the spherical aberration on the wide-angle end falls to overside due to insufficient correction, and comatic aberration is degraded, which causes the degradation of resolution.

Accordingly, the zoom lens according to an embodiment of the present invention satisfying the conditional expressions (1) and (2) is capable of reducing the size of the lens barrel and preventing the degradation of resolution by improving the optical performance at the time of the camera-shake correction, optimizing aberration correction and reducing the entire length of the entire zoom lens system.

Preferably, the zoom lens according to an embodiment of the present invention satisfies the following conditional expression (3).

$$2.0 < ft/f52 < 5.0 \quad (3)$$

where ft is the focal length of the entire lens system at a telephoto end.

The conditional expression (3) defines the ratio between the focal length ft of the entire lens system and the focal length f52 of the movable group of the fifth lens group, namely the range of refractive power ratio.

When the value of ft/f52 in the conditional expression (3) exceeds an upper limit value, the refractive power of the movable group of the fifth lens group becomes too strong, thereby considerably degrading the optical performance on the telephoto end. That is, the astigmatism on the telephoto end falls to underside, and comatic aberration is degraded, which causes the degradation of resolution.

In contrast, when the value of ft/f52 in the conditional expression (3) exceeds a lower limit value, the refractive power of the movable group of the fifth lens group becomes too weak, thereby considerably degrading the optical performance on the telephoto end. That is, the astigmatism on the telephoto end falls to overside, and comatic aberration is degraded, which causes the degradation of resolution.

Consequently, the zoom lens satisfying the conditional expression (3) is capable of suppressing particularly the optical performance degradation on the telephoto end.

Preferably, the zoom lens according to an embodiment of the present invention satisfies the following conditional expression (4).

$$fi < f5 \quad (4)$$

where fi is the focal length of the i-th lens group (i is 1 to 4), and f5 is the focal length of the fifth lens group.

The conditional expression (4) defines the relationship between the focal length f5 of the fifth lens group and the focal length fi (i is 1 to 4) of each of other lens groups (the first to fourth lens groups), i.e., the relationship of refractive power.

When the value of the focal length f5 of the fifth lens group in the conditional expression (4) exceeds the value of the focal length fi of the i-th group, the refractive power of the fifth lens group becomes too strong, thereby considerably degrading especially the optical performance at the time of the camera-shake correction. That is, the refractive power of the movable group having the positive refractive power in the fifth lens group is enhanced. Therefore, when the movable group having the strong refractive power is moved to perform camera-shake correction, particularly the comatic aberration is degraded, and the resolution is considerably lowered as the image height is increased. Additionally, when the value of the focal length f5 of the fifth lens group in the conditional expression (4) exceeds the value of the focal length fi of the i-th lens group, distortion is degraded and the image is considerably distorted asymmetrically.

Consequently, the zoom lens satisfying the conditional expression (4) is capable of suppressing particularly the optical performance degradation at the time of the camera-shake correction.

Preferably, at least one surface of the fifth lens group of the zoom lens according to an embodiment of the present invention is formed of an aspherical surface.

This enables suitable corrections of the spherical aberration and the comatic aberration on the wide-angle end. By forming at least one surface of the fifth lens group into an aspherical surface, it becomes possible to suppress particularly the performance degradation on the telephoto end when the movable group is moved at the time of camera-shake correction. The formation of an aspherical surface in at least one surface of the fifth lens group enables the optical performance improvement both on the wide-angle end and the telephoto end.

In the zoom lens according to an embodiment of the present invention, the fixed group of the fifth lens group is preferably formed by a three-element cemented lens composed of a first lens having a positive refractive power, a second lens having a negative refractive power, and a third lens having a negative refractive power cemented together in the order from the object side to the image side.

This enables suppression of the occurrence of chromatic aberration on the wide-angle end, thereby improving image quality.

In the zoom lens according to an embodiment of the present invention, the movable group of the fifth lens group is preferably formed by a cemented lens composed of a fourth lens having a positive refractive power and a fifth lens having a negative refractive power cemented together in the order from the object side to the image side.

This enables suppression of the occurrence of chromatic aberration on the wide-angle end, thereby improving image quality.

Meanwhile, as high-vision image quality monitors have recently been widely used, small image pickup apparatuses such as video cameras are increasingly required to have high image quality. To satisfy this requirement, it is a problem to improve the image quality on the wide-angle end. Therefore, in terms of the chromatic aberration and the resolution on the wide-angle end, especially high precision aberration correction, such as the corrections of axial chromatic aberration and magnification color aberration, are needed.

For improving the image quality on the wide-angle end, the zoom lens according to the embodiment may be configured as follows.

In the zoom lens according to an embodiment of the present invention, the three-element cemented lens of the fifth lens group is preferably configured to satisfy the following conditional expressions (5) and (6).

$$fm<0 \quad (5)$$

$$vm<30 \quad (6)$$

where fm is the focal length of a middle lens in the three-element cemented lens, and vm is the Abbe number of the middle lens of the three-element cemented lens.

The conditional expression (5) is used to properly set the focal length of the middle lens in the three-element cemented lens of the fifth lens group.

When the value of fm in the conditional expression (5) exceeds an upper limit value, the positive refractive power of the three-element cemented lens in the fifth lens group becomes too strong, and the various aberrations such as spherical aberration and comatic aberration are degraded, thereby lowing image quality.

The conditional expression (6) is used to properly set the Abbe number of the middle lens in the three-element cemented lens of the fifth lens group.

When the value of vm in the conditional expression (6) exceeds an upper limit value, it goes beyond the conditions of chromatic aberration correction by using the three-element cemented lens in the fifth lens group, and the chromatic aberration of the entire zoom lens system is degraded. The conditions of chromatic aberration correction are determined by the relationship of chromatic aberration correction and the relationship of refractive power. Beyond the conditions, it may be difficult to obtain high quality images.

Accordingly, the satisfaction of the conditional expressions (5) and (6) enables suitable corrections of the various aberrations such as spherical aberration and comatic aberration, and also suppresses the occurrence of chromatic aberration, thereby achieving image quality improvement.

The three-element cemented lens for chromatic aberration correction and the like may be arranged at the image side than an aperture stop in order to obtain the configuration particularly contributing to the image quality improvement on the wide-angle end. The aperture stop is arranged at the image side than the second lens group and at the object side than the fifth lens group.

For example, when the aperture stop is arranged at the object side of the third lens group, the light flux incoming through the first lens group is focused on the side near the object, thereby enabling a reduction in the diameter of the first lens group. Further, for example, when the aperture stop is arranged at the image side of the third lens group or the fourth lens group, the light flux incoming through the first lens group is focused on the side near the image, thereby enabling a reduction in the entire length of the entire zoom lens system.

In the zoom lens according to an embodiment of the present invention, the three-element cemented lens of the fifth lens group preferably satisfies the following conditional expression (7).

$$fs<0 \quad (7)$$

where fs is the focal length of the three-element cemented lens.

The conditional expression (7) is used to properly set the focal length of the three-element cemented lens of the fifth lens group.

When the value of fs in the conditional expression (7) exceeds an upper limit value, the positive refractive power of the three-element cemented lens in the fifth lens group becomes too strong, and the various aberrations such as spherical aberration and comatic aberration are degraded, thereby lowering the image quality.

Accordingly, the satisfaction of the conditional expression (7) enables suitable corrections of the various aberrations, thereby achieving image quality improvement.

In the zoom lens according to an embodiment of the present invention, the three-element cemented lens may be arranged in the fifth lens group.

This enables suppression of particularly the chromatic aberration on the wide-angle end, thereby achieving image quality improvement.

Although the foregoing has exemplified the case where the three-element cemented lens is arranged in the fifth lens group, the three-element cemented lens may be arranged in the third or fourth lens group as long as it is arranged at the image side of the aperture stop. This also enables suppression of the chromatic aberration on the wide-angle side, thereby achieving image quality improvement.

As described above, in the zoom lens according to an embodiment of the present invention, the three-element cemented lens may be formed by the first lens having the positive refractive power, the second lens having the negative refractive power, and the third lens having the negative refractive power, which are arranged in the order from the object side to the image side.

Accordingly, particularly the chromatic aberration on the wide-angle end can be corrected suitably to achieve image quality improvement.

Additionally, at least one surface of the three-element cemented lens of the fifth lens group may be formed of an aspherical surface. This enables suitable corrections of the spherical aberration and comatic aberration on the wide-angle end, thereby achieving image quality improvement.

Thus, by properly setting the configuration of the individual lenses and the like as well as the individual conditional expressions, the zoom lens according to an embodiment of the present invention is capable of suppressing the degradation of optical performance, thereby providing the small-sized high image quality and high zoom ratio zoom lens.

Specific embodiments of the zoom lens according to the embodiment and numerical examples where specific numerical values are applied to these embodiments will be described with reference to the accompanying drawings and tables.

In the following description, "Ri" indicates the radius of curvature of the i-th surface from the object side, "Di" indicates the surface interval between the i-th surface and the (i+1)th surface (the distance or air space between the centers of two adjacent lenses), "Ni" indicates the refractive index of d line (wavelength 587.6 nm) of the material constituting the i-th lens, and "vi" indicates the Abbe number in d line (wavelength 587.6 nm) of the material constituting the i-th lens. In the radius of curvature, "∞" indicates that the surface is flat. In the surface interval, "Variable" indicates that the surface interval is variable.

Some lenses used in the individual numerical examples are those having an aspherically shaped lens surface. The aspherical shape is defined by the following equation:

$$Xi=(Ci \cdot Y^2)/\{1+(1-Ci^2 \cdot Y^2)^{1/2}\}+A4 \cdot Y^4+A6 \cdot Y^6+A8 \cdot Y^8+A10 \cdot Y^{10}$$

where "Xi" is the coordinate in an optical axis direction of an aspherical surface in the i-th surface, "Ci" is the paraxial curvature (the inverse of the radius of curvature) in the i-th surface, "Y" is the distance from the optical axis, and A4, A6, A8, and A10 are 4th-order, 6th-order, 8th-order and 10th-order aspherical coefficients, respectively.

FIG. 1 shows the lens configuration of the zoom lens 1 according to a first embodiment of the invention.

As shown in FIG. 1, the zoom lens 1 is formed by 14 lenses.

A first lens group GR1 has a positive refractive power as a whole, and is formed by three lenses of a lens L1, a lens L2, and a lens L3. These lenses L1 and L2 form a cemented lens having a cemented surface R2 by cementing a concave surface and a convex surface facing the image side of the lens L1 and the object side of the lens L2, respectively, and having the same radius of curvature.

A second lens group GR2 has a negative refractive power as a whole, and is formed by three lenses of a lens L4, a lens L5, and a lens L6. The second lens group GR2 is movable in the optical axis direction, and functions to mainly perform a zooming. These lens L5 and L6 form a cemented lens having a cemented surface R9 by cementing a concave surface and a convex surface facing the image side of the lens L5 and the object side of the lens L6, respectively, and having the same radius of curvature. The concave surface of the lens L4 at the image side is formed of an aspherical surface.

A third lens group GR3 is formed by a single lens L7 having a positive refractive power. The lens L7 is a meniscus lens having its convex surface facing the object side, and both of the object side surface and the image side surface are formed of an aspherical surface.

A fourth lens group GR4 has a positive refractive power as a whole, and is formed by two lenses of a lens L8 and a lens L9. The fourth lens group GR4 is movable in the optical axis direction, and has functions of performing focal position correction and focusing by performing a zooming. These lens L8 and L9 form a cemented lens having a cemented surface R15 by cementing a concave surface and a convex surface facing the image side of the lens L8 and the object side of the lens L9, respectively, and having the same radius of curvature. The image side surface of the lens L9 is formed of an aspherical surface.

A fifth lens group GR5 has a positive refractive power as a whole, and is formed by five lenses of a lens L10, a lens L11, a lens L12, a lens L13, and a lens L14. In the fifth lens group GR5, these three lenses L10, L11, and L12 form a fixed group GR5-1 having a negative refractive power and being fixed in position, and these two lenses L13 and L14 form a movable group GR5-2 having a positive refractive power and being movable in a direction substantially orthogonal to the optical axis. The fixed group GR5-1 and the movable group GR5-2 are arranged in the order from the object side to the image side.

The image formed on the image surface can be moved in a direction substantially orthogonal to an optical axis by moving the movable group GR5-2 of the fifth lens group GR5 disposed the most image-side, in the direction substantially orthogonal to the optical axis.

These lenses L10, L11, and L12 form a three-element cemented lens having cemented surfaces R18 and R19, each of which is obtained by cementing a concave surface and a convex surface facing the image side and the object side, respectively, and having the same radius of curvature. The image side surface of the lens L12 is formed of an aspherical surface.

A lens L13 and a lens L14 form a cemented lens having a cemented surface R22 by cementing a concave surface and a convex surface facing the image side of the lens L13 and the object side of the lens L14, respectively, and having the same radius of curvature. The image side surface of the lens L13 is formed of an aspherical surface.

An iris IR (an iris surface R11) is arranged between the second lens group GR2 and the third lens group GR3, and the iris IR is fixed.

A filter FL (filter surfaces R24 and R25) is arranged between the fifth lens group GR5 and the image surface IMG.

The zoom lens 1 is configured to satisfy the conditional expressions (1) to (7).

Table 1 shows the lens data of a numerical example 1, to which specific numerical values are applied to the zoom lens 1 according to the first embodiment.

TABLE 1

| Ri | | Di | | Ni | | vi | |
|---|---|---|---|---|---|---|---|
| R1 | 22.607 | D1 | 0.172 | N1 | 1.847 | v1 | 23.8 |
| R2 | 4.799 | D2 | 0.614 | N2 | 1.697 | v2 | 55.5 |
| R3 | −23.792 | D3 | 0.029 | | | | |
| R4 | 4.663 | D4 | 0.376 | N3 | 1.883 | v3 | 40.8 |
| R5 | 15.758 | D5 | Variable | | | | |
| R6 | 15.758 | D6 | 0.114 | N4 | 1.851 | v4 | 40.1 |
| R7 | 1.565 | D7 | 0.392 | | | | |
| R8 | −1.899 | D8 | 0.095 | N5 | 1.806 | v5 | 40.7 |
| R9 | 1.609 | D9 | 0.318 | N6 | 1.923 | v6 | 20.9 |
| R10 | −18.224 | D10 | Variable | | | | |
| R11 | iris ∞ | D11 | 0.301 | | | | |
| R12 | 3.000 | D12 | 0.416 | N7 | 1.583 | v7 | 59.5 |
| R13 | −7.533 | D13 | Variable | | | | |
| R14 | 2.542 | D14 | 0.095 | N8 | 1.923 | v8 | 20.9 |
| R15 | 1.615 | D15 | 0.515 | N9 | 1.592 | v9 | 67.1 |
| R16 | −4.032 | D16 | Variable | | | | |
| R17 | −60.037 | D17 | 0.273 | N10 | 1.946 | v10 | 18.0 |
| R18 | −2.038 | D18 | 0.095 | N11 | 1.847 | v11 | 23.8 |
| R19 | 5.955 | D19 | 0.133 | N12 | 1.851 | v12 | 40.1 |
| R20 | 1.799 | D20 | 0.623 | | | | |
| R21 | 3.420 | D21 | 0.572 | N13 | 1.694 | v13 | 53.2 |
| R22 | −2.286 | D22 | 0.120 | N14 | 1.847 | v14 | 23.8 |
| R23 | −3.981 | D23 | 1.349 | | | | |
| R24 | filter ∞ | D24 | 0.313 | N15 | 1.517 | v15 | 64.2 |
| R25 | filter ∞ | D25 | | | | | |

In the zoom lens 1, the zooming from the wide-angle end state to the telephoto end state causes changes in a surface interval D5 between the first lens group GR1 and the second lens group GR2, a surface interval D10 between the second lens group GR2 and the third lens group (the aperture stop SP) GR3, a surface interval D13 between the third lens group GR3 and the fourth lens group GR4, and a surface interval D16 between the fourth lens group GR4 and the fifth lens group GR5. Table 2 shows the corresponding values when the object distance is an infinite distance in the wide-angle end state (the focal length f=1.00), the middle focal length state (the focal length f=5.53) and the telephoto end state (the focal length f=10.93) in the numerical example 1.

TABLE 2

| | Focal Length | | |
|---|---|---|---|
| | 1 | 5.532 | 10.930 |
| D5 | 0.133 | 2.975 | 3.778 |
| D10 | 3.879 | 1.038 | 0.234 |
| D13 | 0.922 | 0.282 | 0.840 |
| D16 | 0.172 | 0.811 | 0.253 |

In the zoom lens 1, the image side surface (R7) of the lens L4 of the second lens group GR2, both surfaces (R12 and R13) of the lens L7 of the third lens group GR3, the image side surface (R16) of the lens L9 of the fourth lens group GR4, the image side surface (R20) of the lens L12 of the fifth lens group GR5, and the object side surface (R21) of the lens L12 of the fifth lens group GR5 are each formed of an aspherical surface. Table 3 shows the 4th-order, 6th-order, 8th-order, and 10th-order aspherical coefficients A4, A6, A8, and A10 in the numerical example 1.

In Table 3 and later-described tables showing aspherical coefficients, "E-i" indicates an exponential expression taking "10" as the bottom, that is, "$10^{-i}$". For example, "0.12345E–05" indicates "$0.12345 \times 10^{-5}$".

TABLE 3

| Aspherical Coefficient | A4 | A6 | A8 | A10 |
|---|---|---|---|---|
| R7 | 1.972E−03 | 1.174E−02 | 0.000E+00 | 0.000E+00 |
| R12 | −1.029E−02 | 4.779E−04 | −3.163E−03 | 0.000E+00 |
| R13 | 7.289E−03 | 7.875E−04 | −3.288E−03 | 0.000E+00 |
| R16 | 1.352E−02 | −2.648E−03 | 0.000E+00 | 0.000E+00 |
| R20 | −6.447E−03 | 4.947E−03 | −1.267E−03 | 0.000E+00 |
| R21 | −1.165E−02 | 3.006E−03 | −1.354E−03 | 0.000E+00 |

Table 4 shows the individual values of the conditional expressions (1) to (7) in the zoom lens 1, i.e., the focal length (fi) of the individual lens groups GRi (i is 1 to 5), the focal length (f51) of the fixed group GR5-1 of the fifth lens group, the focal length (f52) of the movable group GR5-2 of the fifth lens group, the focal length (fw) of the entire lens system in the wide-angle end, the focal length (ft) of the entire lens system in the telephoto end, the focal length (fm) of the middle lens in the three-element cemented lens in the fifth lens group, the Abbe number (vm) of the middle lens in the three-element cemented lens of the fifth lens group, the focal length (fs) of the three-element cemented lens of the fifth lens group, the full aperture F value (Fno.), the angle of view (2ω) and the refractive power ratio (|f51/f52|, fw/f52, and ft/f52).

TABLE 4

| |f51/f52| | 0.77 |
|---|---|
| fw/f52 | 0.34 |
| ft/f52 | 3.68 |
| fm | −1.77 |
| vm | 23.78 |
| fs | −2.27 |
| f1 | 5.87 |
| f2 | −1.20 |
| f3 | 3.73 |
| f4 | 3.35 |
| f5 | 58.29 |
| f51 | −2.28 |
| f52 | 2.97 |
| fw | 1.00 |
| ft | 10.93 |

TABLE 4-continued

| Fno. | 1.85 to 3.18 |
|---|---|
| 2ω | 62.3° to 5.8° |

Figure 2:
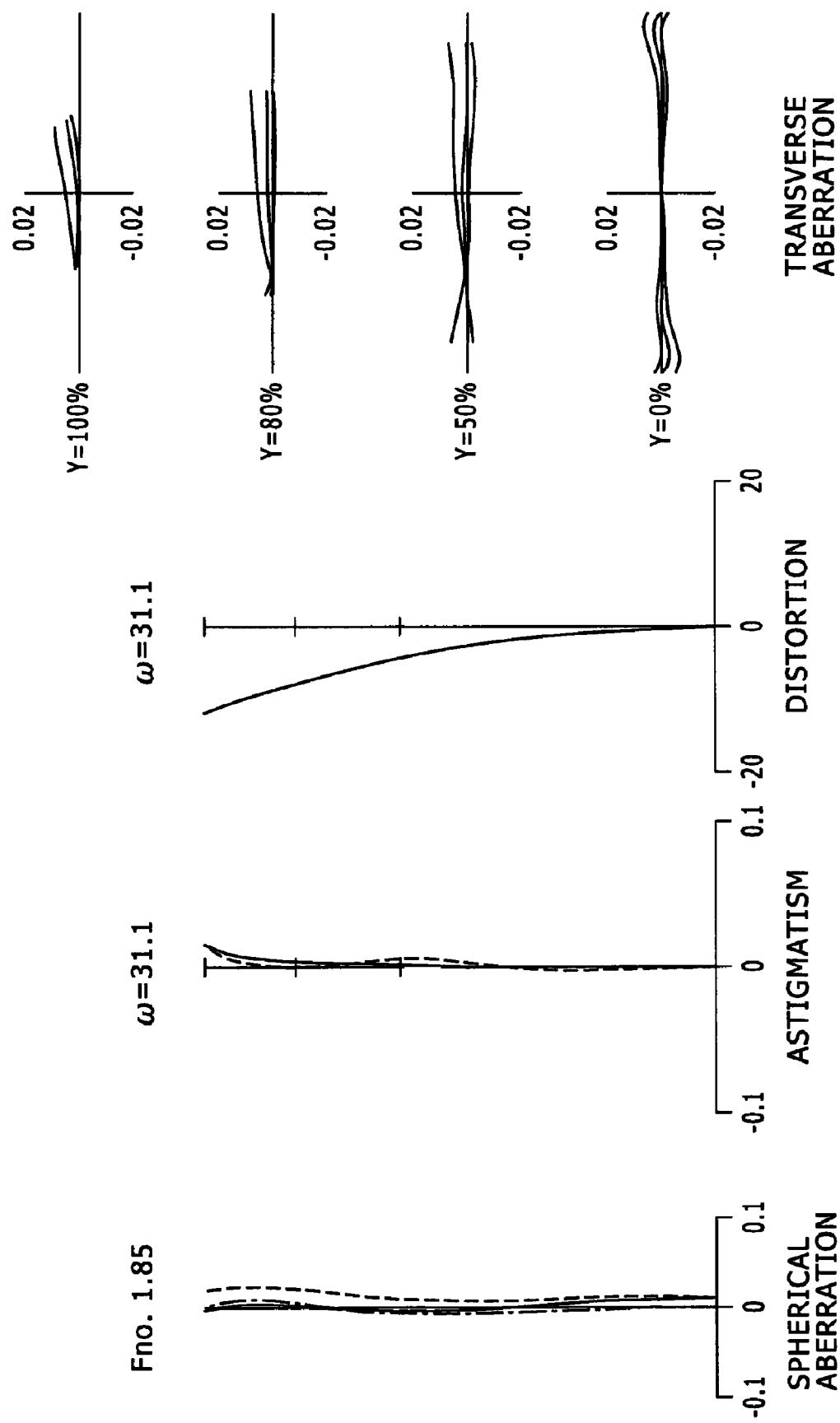
FIG. 2 shows, together with FIGS. 3 and 4, aberration diagrams as a numerical example, to which specific numerical values are applied to the first embodiment, particularly showing the spherical aberration, astigmatism, distortion, and transverse aberration in a wide-angle end state.
Figure 3:
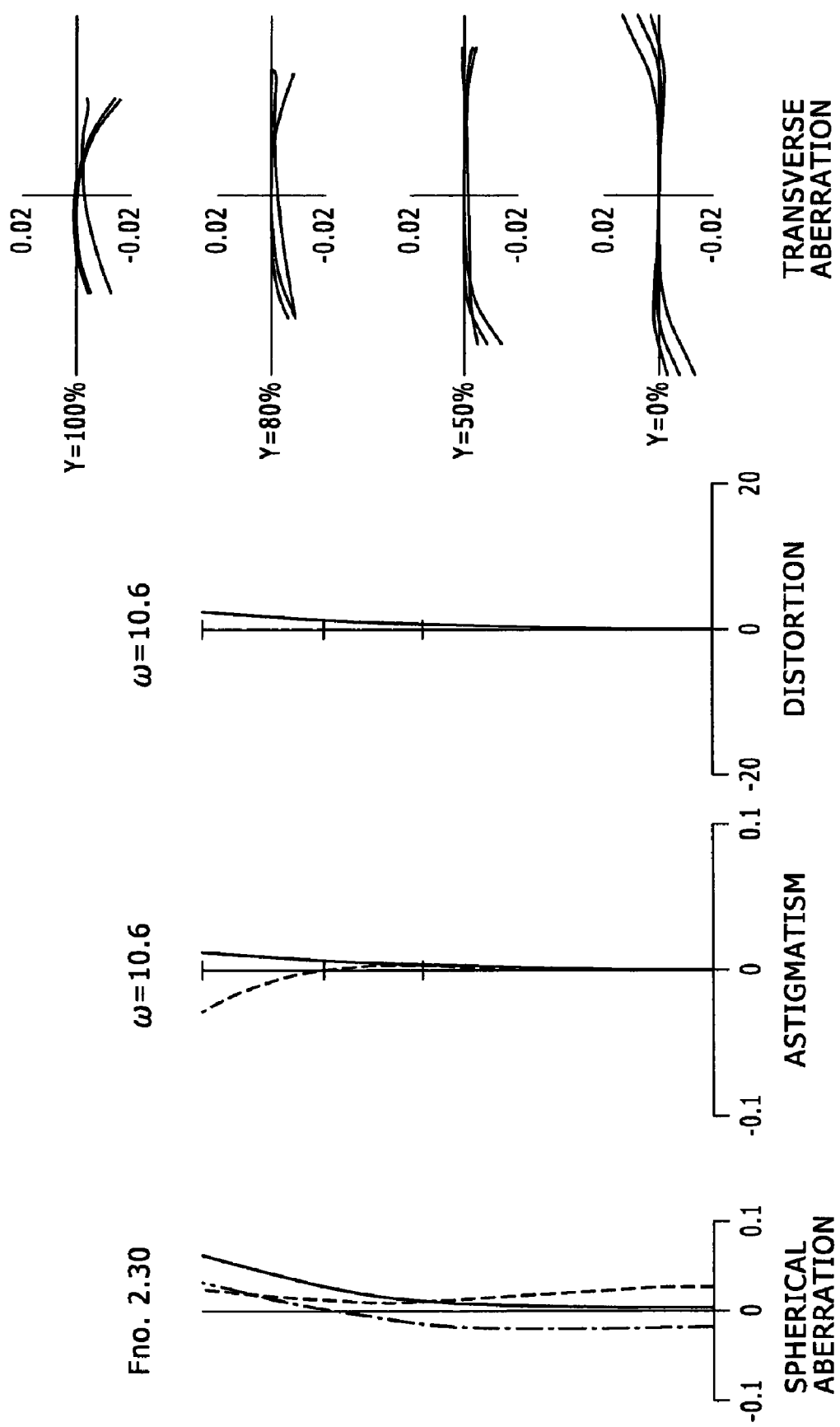
FIG. 3 shows the spherical aberration, astigmatism, distortion, and transverse aberration in a middle focal length state.
Figure 4:
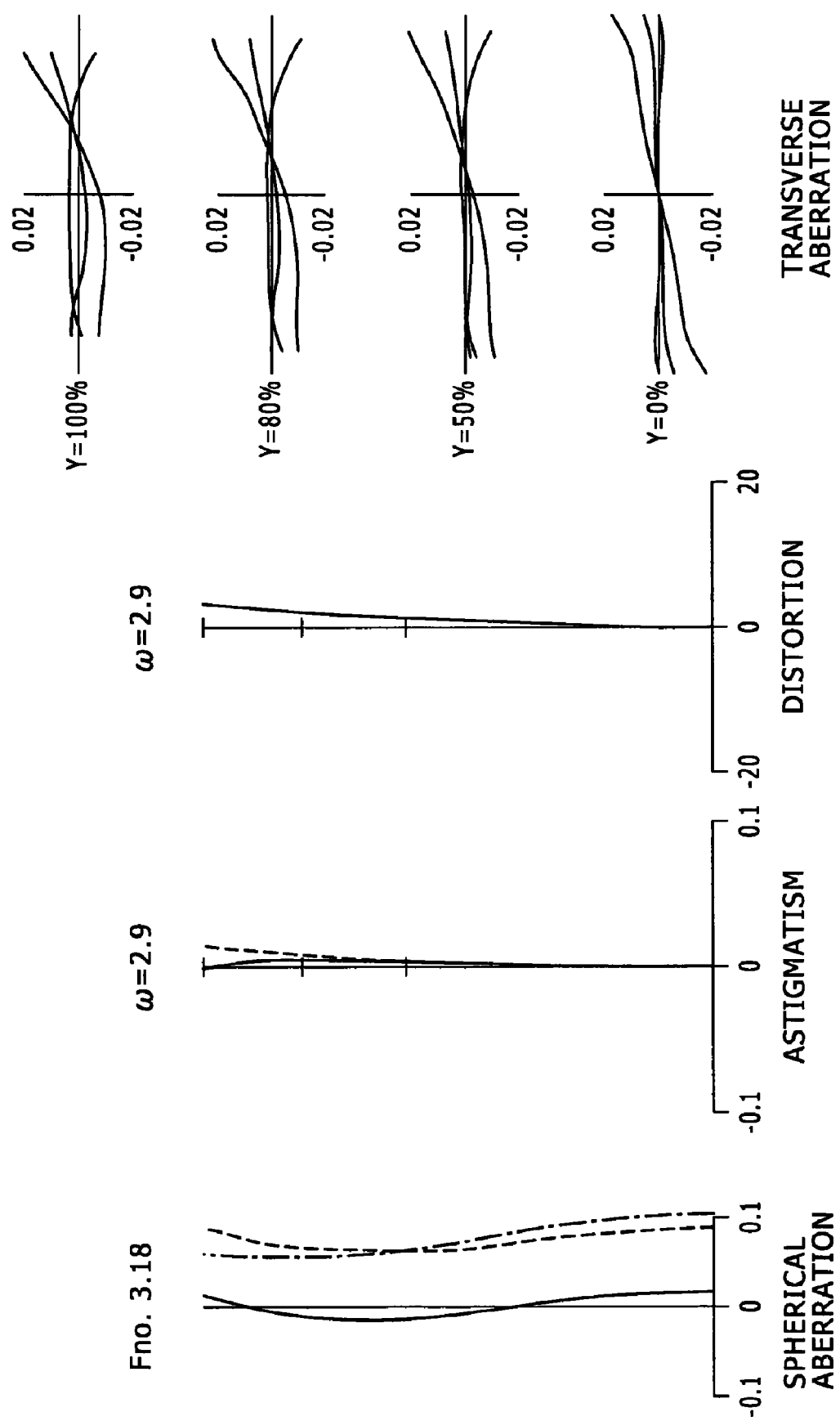
FIG. 4 shows the spherical aberration, astigmatism, distortion, and transverse aberration in a telephoto end state.

FIGS. 2 to 4 show various aberration diagrams when the numerical example 1 is brought into the infinite distance. Specifically, FIGS. 2 to 4 show the various aberration diagrams under a wide-angle end state, a middle focal length state, and a telephoto end state, respectively.

In the spherical aberration diagrams shown in FIGS. 2 to 4, the solid line represents the values of d line (wavelength 587.6 nm), the dotted line represents the values of g line (wavelength 435.8 nm) and the chain line represents the values of C line (wavelength 656.3 nm). In the astigmatism diagrams shown in FIGS. 2 to 4, the solid line represents the values of a sagittal image surface, and the broken line represents the values of a meridional image surface.

It will be clear from these aberration diagrams that the numerical example 1 enables suitable corrections of the various aberrations and has excellent image forming performance.

Figure 5:
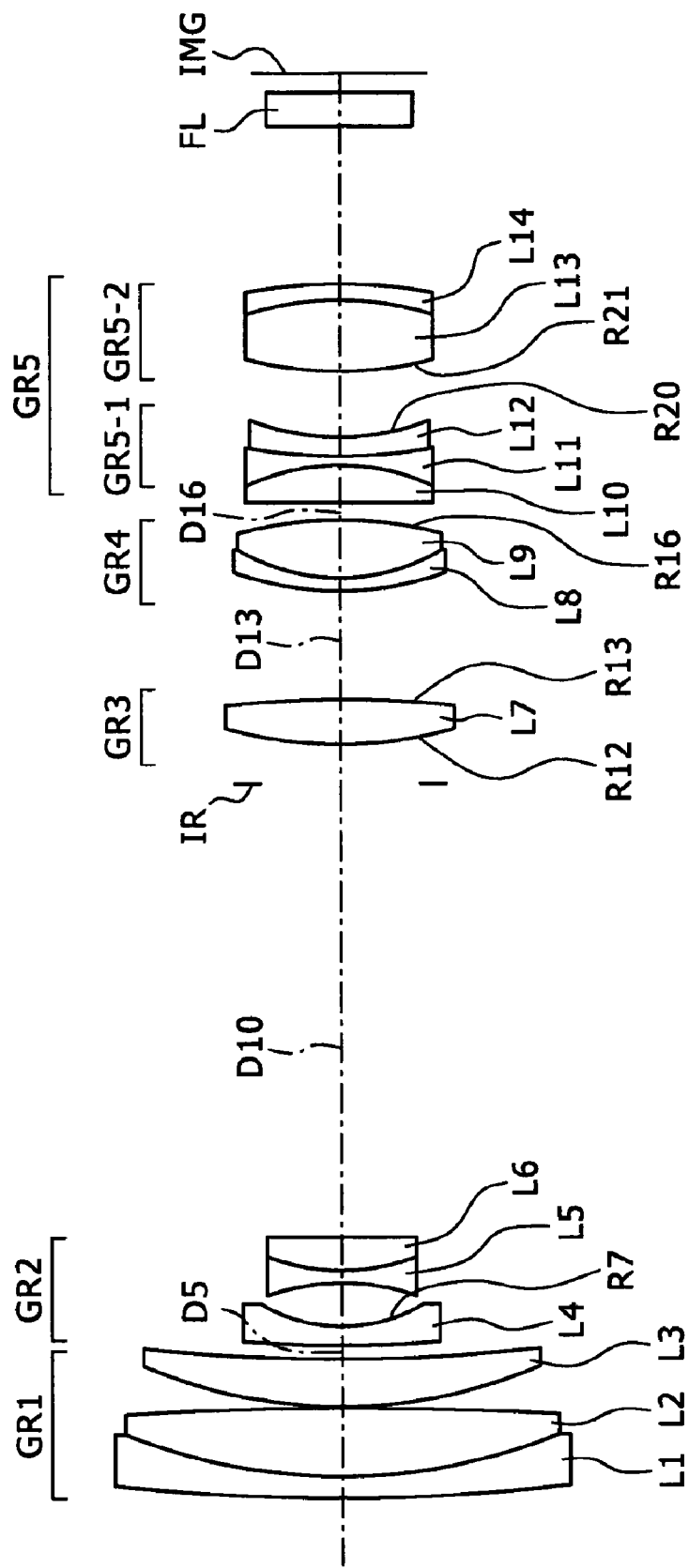
FIG. 5 shows the lens configuration according to a second embodiment of the zoom lens according to an embodiment of the present invention.

FIG. 5 shows the lens configuration of a zoom lens 2 according to a second embodiment of the present invention.

As shown in FIG. 5, the zoom lens 2 according to the second embodiment is formed by 14 lenses.

A first lens group GR1 has a positive refractive power as a whole, and is formed by three lenses of a lens L1, a lens L2, and a lens L3. These lenses L1 and L2 form a cemented lens having a cemented surface R2 by cementing a concave surface and a convex surface facing the image side of the lens L1 and the object side of the lens L2, respectively, and having the same radius of curvature.

A second lens group GR2 has a negative refractive power as a whole, and is formed by three lenses of a lens L4, a lens L5, and a lens L6. The second lens group GR2 is movable in the optical axis direction, and functions to mainly perform a zooming. These lens L5 and L6 form a cemented lens having a cemented surface R9 by cementing a concave surface and a convex surface facing the image side of the lens L5 and the object side of the lens L6, respectively, and having the same radius of curvature. The concave surface of the lens L4 at the image side is formed of an aspherical surface.

A third lens group GR3 is formed by a single lens L7 having a positive refractive power. The lens L7 is a meniscus lens having a convex surface facing the object side, and both of the object side surface and the image side surface are formed of aspherical surfaces.

A fourth lens group GR4 has a positive refractive power as a whole, and is formed by two lenses of a lens L8 and a lens L9. The fourth lens group GR4 is movable in the optical axis direction, and has functions of performing focal position correction and focusing by performing a zooming. These lens L8 and L9 form a cemented lens having a cemented surface R15 by cementing a concave surface and a convex surface facing the image side of the lens L8 and the object side of the lens L9, respectively, and having the same radius of curvature. The image side surface of the lens L9 is formed of an aspherical surface.

A fifth lens group GR5 has a positive refractive power as a whole, and is formed by five lenses of a lens L10, a lens L11, a lens L12, a lens L13, and a lens L14. In the fifth lens group GR5, these three lenses L10, L11, and L12 form a fixed group GR5-1 being fixed in position and having a negative refractive power, and these two lenses L13 and L14 form a movable group GR5-2 having a positive refractive power and being movable in a direction substantially orthogonal to the optical axis. The fixed group GR5-1 and the movable group GR5-2 are arranged in the order from the object side to the image side.

The image formed on the image surface can be moved in a direction substantially orthogonal to an optical axis by moving the movable group GR5-2 of the fifth lens group GR5 disposed at the most image-side, in the direction substantially orthogonal to the optical axis.

These lenses L10, L11, and L12 form a three-element cemented lens having cemented surfaces R18 and R19, each of which is obtained by cementing a concave surface and a convex surface facing the image side and the object side, respectively, and having the same radius of curvature. The image side surface of the lens L12 is formed of an aspherical surface.

A lens L13 and a lens L14 form a cemented lens having a cemented surface R22 by cementing a concave surface and a convex surface facing the image side of the lens L13 and the object side of the lens L14, respectively, and having the same radius of curvature. The image side surface of the lens L13 is formed of an aspherical surface.

An iris IR (an iris surface R11) is arranged between the second lens group GR2 and the third lens group GR3, and the iris IR is fixed.

A filter FL (filter surfaces R24 and R25) is arranged between the fifth lens group GR5 and the image surface IMG.

The zoom lens 2 is configured to satisfy the conditional expressions (1) to (7).

Table 5 shows the lens data of a numerical example 2, to which specific numerical values are applied to the zoom lens 2 according to the second embodiment.

TABLE 5

| Ri | | Di | | Ni | | vi | |
|---|---|---|---|---|---|---|---|
| R1 | 23.136 | D1 | 0.171 | N1 | 1.847 | v1 | 23.8 |
| R2 | 4.899 | D2 | 0.604 | N2 | 1.697 | v2 | 55.5 |
| R3 | −23.810 | D3 | 0.029 | | | | |
| R4 | 4.772 | D4 | 0.370 | N3 | 1.883 | v3 | 40.8 |
| R5 | 16.287 | D5 | Variable | | | | |
| R6 | 16.287 | D6 | 0.114 | N4 | 1.851 | v4 | 40.1 |
| R7 | 1.607 | D7 | 0.374 | | | | |
| R8 | −1.958 | D8 | 0.095 | N5 | 1.806 | v5 | 40.7 |
| R9 | 1.539 | D9 | 0.320 | N6 | 1.923 | v6 | 20.9 |
| R10 | −36.839 | D10 | Variable | | | | |
| R11 | iris ∞ | D11 | 0.301 | | | | |
| R12 | 3.271 | D12 | 0.414 | N7 | 1.583 | v7 | 59.5 |
| R13 | −6.445 | D13 | Variable | | | | |
| R14 | 2.464 | D14 | 0.100 | N8 | 1.923 | v8 | 20.9 |
| R15 | 1.589 | D15 | 0.514 | N9 | 1.592 | v9 | 67.1 |
| R16 | −4.282 | D16 | Variable | | | | |
| R17 | −19.482 | D17 | 0.286 | N10 | 1.946 | v10 | 18.0 |
| R18 | −1.826 | D18 | 0.095 | N11 | 1.847 | v11 | 23.8 |
| R19 | 5.952 | D19 | 0.133 | N12 | 1.851 | v12 | 40.1 |
| R20 | 1.901 | D20 | 0.762 | | | | |
| R21 | 3.562 | D21 | 0.571 | N13 | 1.694 | v13 | 53.2 |
| R22 | −2.229 | D22 | 0.105 | N14 | 1.847 | v14 | 23.8 |
| R23 | −3.586 | D23 | 1.299 | | | | |
| R24 | filter ∞ | D24 | 0.313 | N15 | 1.517 | v15 | 64.2 |
| R25 | filter ∞ | D25 | | | | | |

In the zoom lens 2, the zooming from the wide-angle end state to the telephoto end state causes changes in a surface interval D5 between the first lens group GR1 and the second lens group GR2, a surface interval D10 between the second lens group GR2 and the third lens group (the aperture stop SP) GR3, a surface interval D13 between the third lens group GR3 and the fourth lens group GR4, and a surface interval D16 between the fourth lens group GR4 and the fifth lens group GR5. Table 6 shows the corresponding values when the object distance is an infinite distance in the wide-angle end state (the focal length f=1.92), the middle focal length state (the focal length f=5.84) and the telephoto end state (the focal length f=10.92) in the numerical example 2.

TABLE 6

| | Focal Length | | |
|---|---|---|---|
| | 1 | 5.844 | 10.921 |
| D5 | 0.133 | 3.077 | 3.827 |
| D10 | 3.928 | 0.984 | 0.234 |
| D13 | 0.987 | 0.296 | 0.783 |
| D16 | 0.206 | 0.897 | 0.410 |

In the zoom lens 2, the image side surface (R7) of the lens L4 of the second lens group GR2, both surfaces (R12 and R13) of the lens L7 of the third lens group GR3, the image side surface (R16) of the lens L9 of the fourth lens group GR4, the image side surface (R20) of the lens L12 of the fifth lens group GR5, and the object side surface (R21) of the lens L12 of the fifth lens group GR5 are each formed of aspherical surface. Table 7 shows the 4th-order, 6th-order, 8th-order, and 10th-order aspherical coefficients A4, A6, A8, and A10 in the numerical example 2.

TABLE 7

| Aspherical Coefficient | A4 | A6 | A8 | A10 |
|---|---|---|---|---|
| R7 | 2.902E−03 | 1.274E−02 | 0.000E+00 | 0.000E+00 |
| R12 | −8.466E−03 | 1.204E−03 | −1.328E−03 | 0.000E+00 |
| R13 | 7.066E−03 | 1.354E−03 | −1.378E−03 | 0.000E+00 |
| R16 | 1.218E−02 | −2.265E−03 | 0.000E+00 | 0.000E+00 |
| R20 | −6.474E−03 | 4.137E−03 | 3.286E−03 | 0.000E+00 |
| R21 | −1.442E−02 | −1.006E−03 | 3.559E−03 | 0.000E+00 |

Table 8 shows the individual values of the conditional expressions (1) to (7) in the zoom lens 2, i.e., the focal length (fi) of the individual lens groups GRi (i is 1 to 5), the focal length (f51) of the fixed group GR5-1 of the fifth lens group, the focal length (f52) of the movable group GR5-2 of the fifth lens group, the focal length (fw) of the entire lens system in the wide-angle end, the focal length (ft) of the entire lens system in the telephoto end, the focal length (fm) of the middle lens in the three-element cemented lens in the fifth lens group, the Abbe number (vm) of the middle lens in the three-element cemented lens of the fifth lens group, the focal length (fs) of the three-element cemented lens of the fifth lens group, the full aperture F value (Fno.), the angle of view (2ω) and the refractive power ratio (|f51/f52|, fw/f52, and ft/f52).

TABLE 8

| |f51/f52| | 0.79 |
|---|---|
| fw/f52 | 0.35 |
| ft/f52 | 3.82 |
| fm | −1.63 |
| vm | 23.78 |
| fs | −2.25 |
| f1 | 5.96 |
| f2 | −1.20 |
| f3 | 3.76 |
| f4 | 3.36 |
| f5 | 17.52 |
| f51 | −2.25 |
| f52 | 2.86 |
| fw | 1.00 |
| ft | 10.92 |

TABLE 8-continued

| Fno. | 1.85 to 3.18 |
|---|---|
| 2ω | 62.3° to 5.8° |

Figure 6:
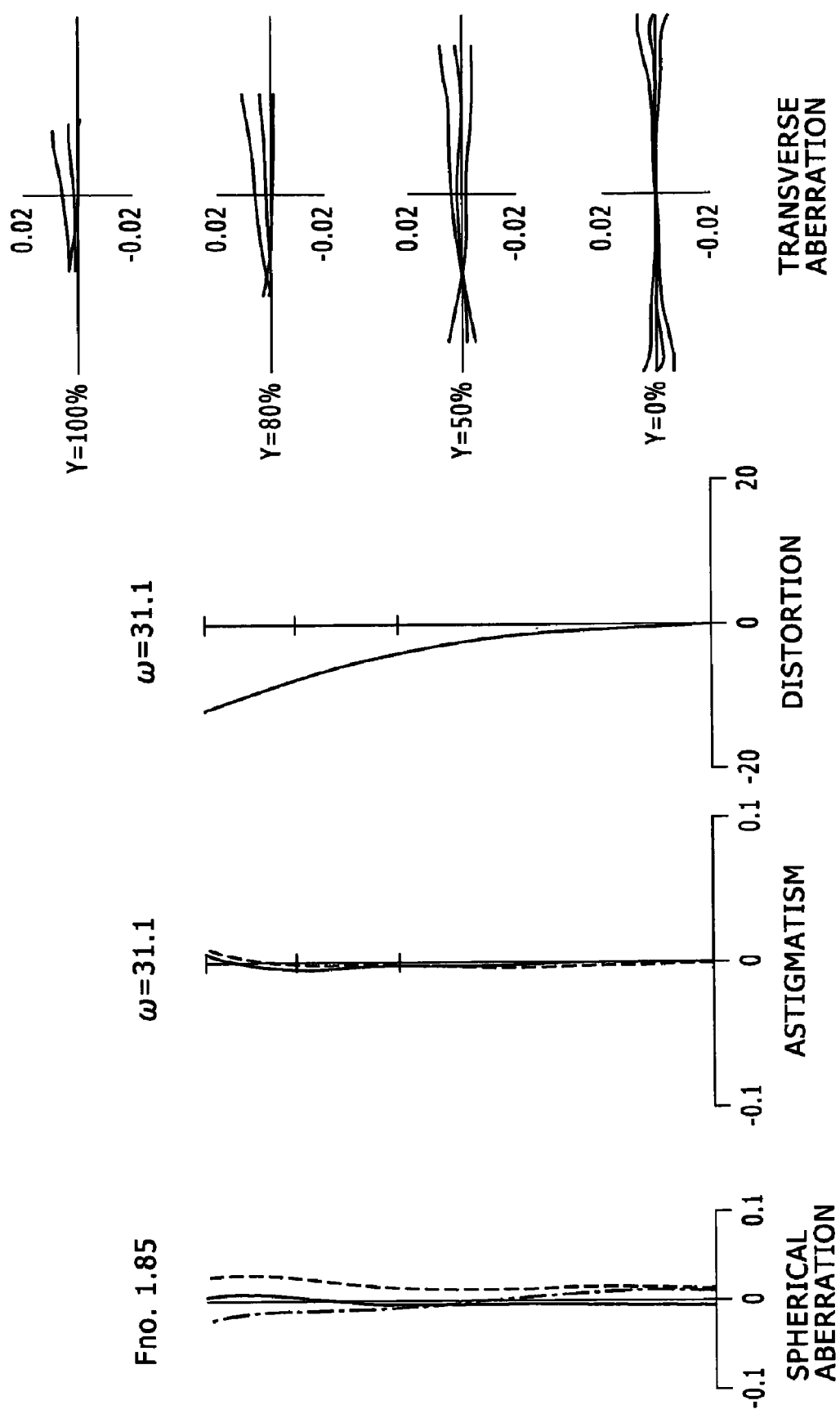
FIG. 6 shows, together with FIGS. 7 and 8, aberration diagrams as a numerical example, to which specific numerical values are applied to the second embodiment, particularly showing the spherical aberration, astigmatism, distortion, and transverse aberration in a wide-angle end state.
Figure 7:
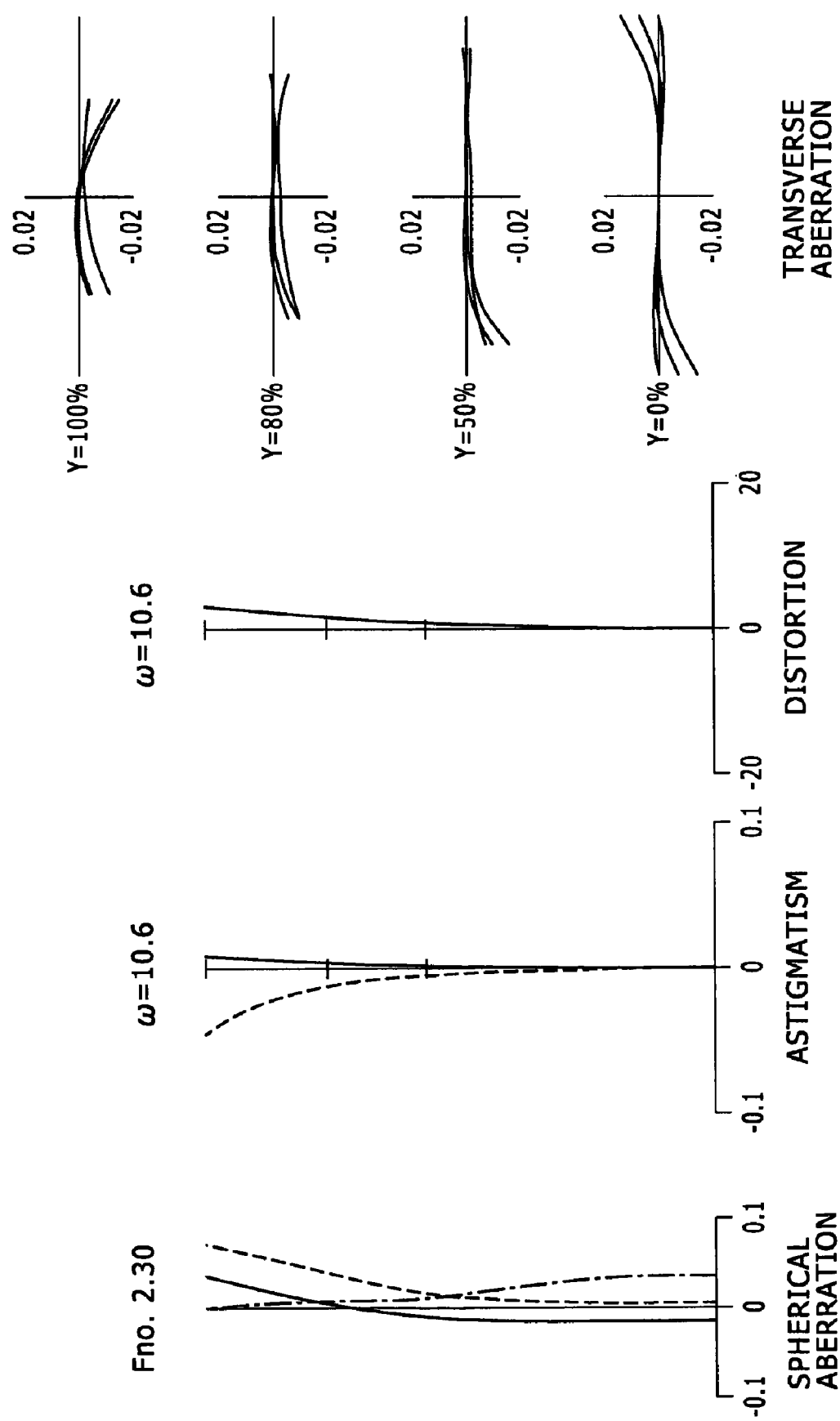
FIG. 7 shows the spherical aberration, astigmatism, distortion, and transverse aberration in a middle focal length state.
Figure 8:
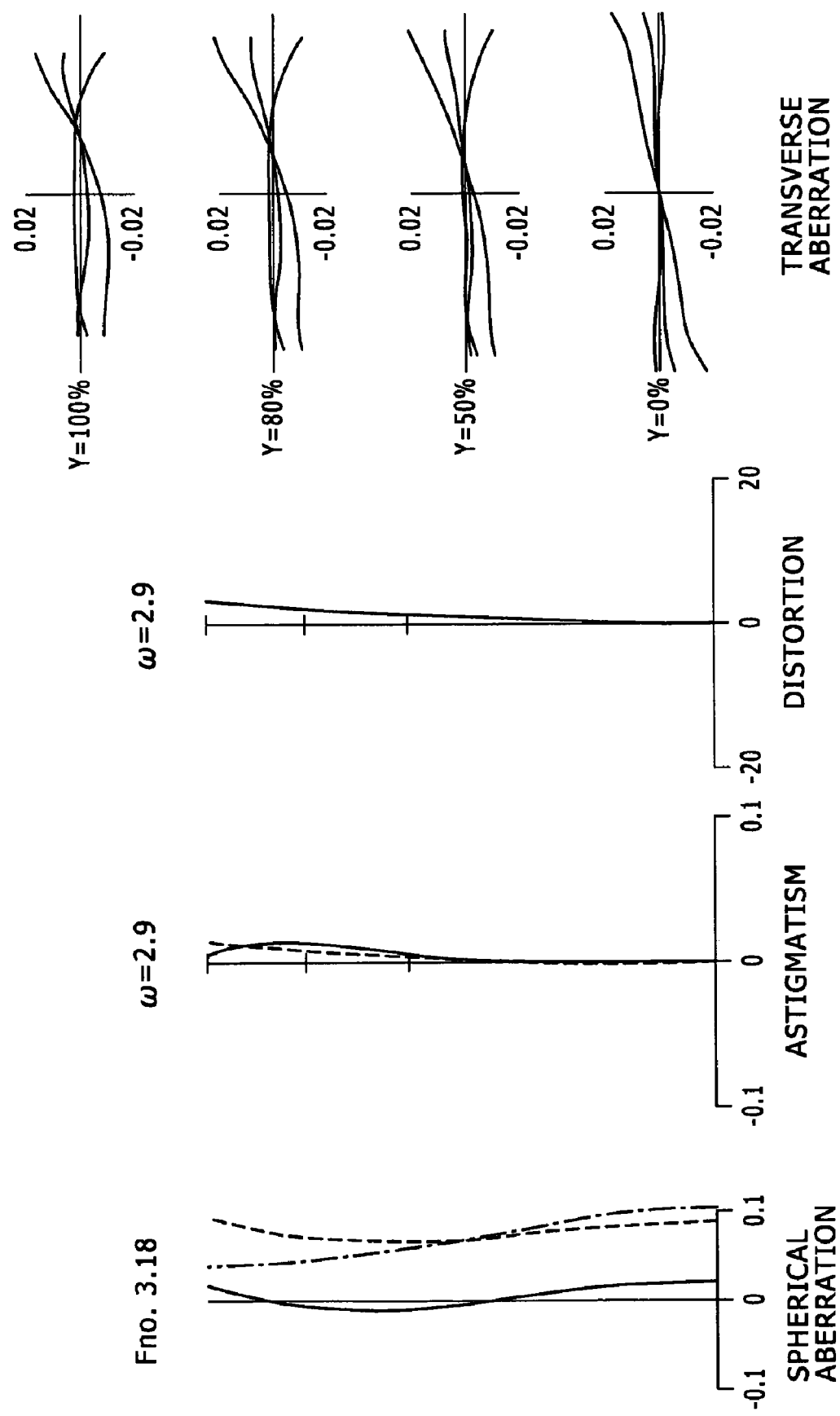
FIG. 8 shows the spherical aberration, astigmatism, distortion, and transverse aberration in a telephoto end state.

FIGS. 6 to 8 show various aberration diagrams when the numerical example 2 is brought into the infinite distance. Specifically, FIGS. 6 to 8 show the various aberration diagrams under a wide-angle end state, a middle focal length state, and a telephoto end state, respectively.

In the spherical aberration diagrams shown in FIGS. 6 to 8, the solid line represents the values of d line (wavelength of 587.6 nm), the dotted line represents the values of g line (wavelength of 435.8 nm) and the chain line represents the values of C line (wavelength of 656.3 nm). In the astigmatism diagrams shown in FIGS. 6 to 8, the solid line represents the values of a sagittal image surface, and the broken line represents the values of a meridional image surface.

It will be clear from these aberration diagrams that the numerical example 2 enables suitable corrections of the various aberrations and has excellent image forming performance.

Figure 9:
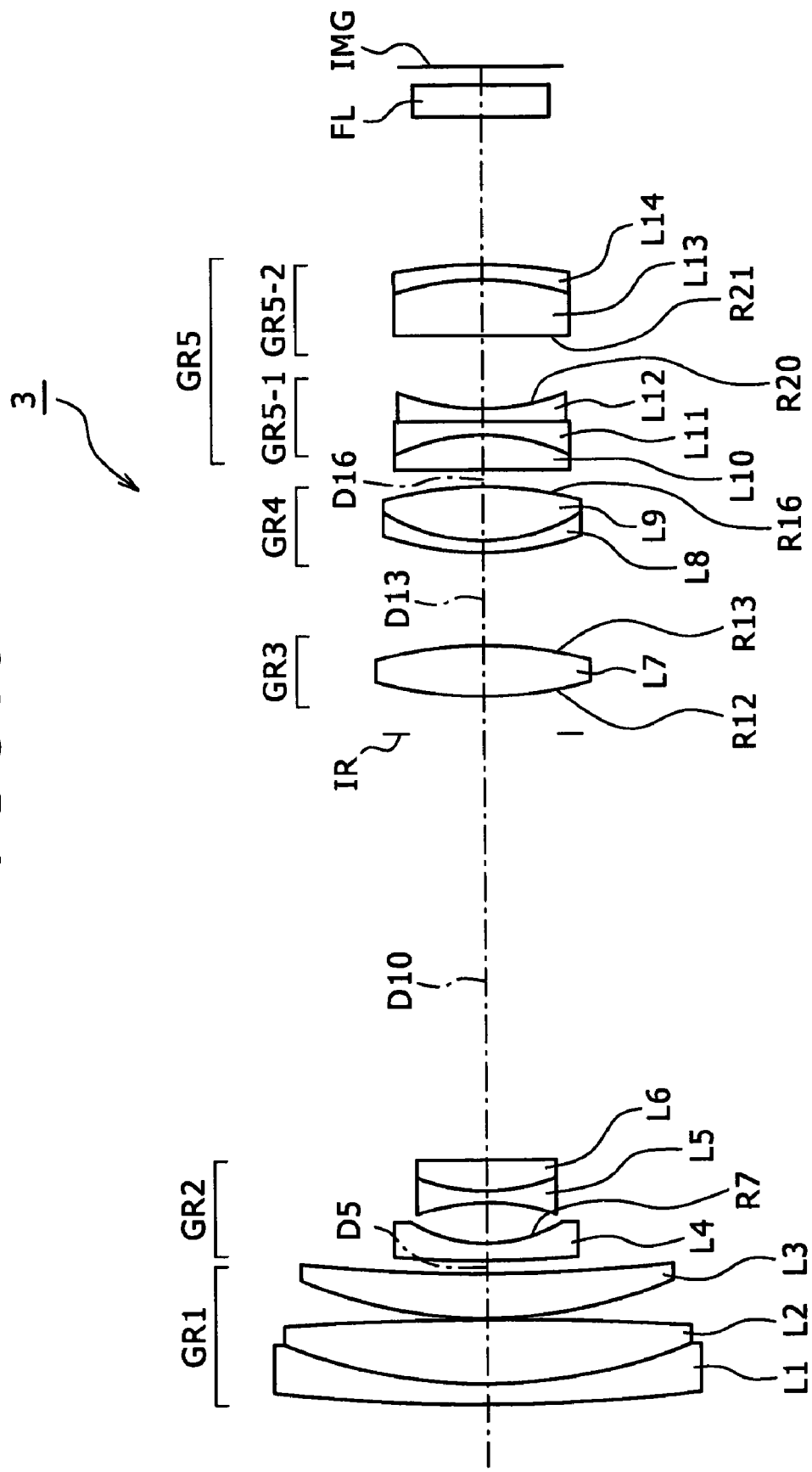
FIG. 9 shows the lens configuration according to a third embodiment of the zoom lens according to an embodiment of the present invention.

FIG. 9 shows the lens configuration of a zoom lens 3 according to a third embodiment of the present invention.

As shown in FIG. 9, the zoom lens 3 of the third embodiment is formed by 14 lenses.

A first lens group GR1 has a positive refractive power as a whole, and is formed by three lenses of a lens L1, a lens L2, and a lens L3. These lenses L1 and L2 form a cemented lens having a cemented surface R2 by cementing a concave surface and a convex surface facing the image side of the lens L1 and the object side of the lens L2, respectively, and having the same radius of curvature.

A second lens group GR2 has a negative refractive power as a whole, and is formed by three lenses of a lens L4, a lens L5, and a lens L6. The second lens group GR2 is movable in the optical axis direction, and functions to mainly perform a zooming. These lens L5 and L6 form a cemented lens having a cemented surface R9 by cementing a concave surface and a convex surface facing the image side of the lens L5 and the object side of the lens L6, respectively, and having the same radius of curvature. The concave surface of the lens L4 at the image side is formed of an aspherical surface.

A third lens group GR3 is formed by a single lens L7 having a positive refractive power. The lens L7 is a meniscus lens having a convex surface facing the object side, and both of the object side surface and the image side surface are formed of aspherical surface.

A fourth lens group GR4 has a positive refractive power as a whole, and is formed by two lenses of a lens L8 and a lens L9. The fourth lens group GR4 is movable in the optical axis direction, and has functions of performing focal position correction and focusing by performing a zooming. These lens L8 and L9 form a cemented lens having a cemented surface R15 by cementing a concave surface and a convex surface facing the image side of the lens L8 and the object side of the lens L9, respectively, and having the same radius of curvature. The image side surface of the lens L9 is formed of an aspherical surface.

A fifth lens group GR5 has a positive refractive power as a whole, and is formed by five lenses of a lens L10, a lens L11, a lens L12, a lens L13, and a lens L14. In the fifth lens group GR5, these three lenses L10, L11, and L12 form a fixed group GR5-1 being fixed and having a negative refractive power, and these two lenses L13 and L14 form a movable group GR5-2 having a positive refractive power and being movable in a direction substantially orthogonal to the optical axis. The fixed group GR5-1 and the movable group GR5-2 are arranged in the order from the object side to the image side.

The image formed on the image surface can be moved in a direction substantially orthogonal to an optical axis by moving the movable group GR5-2 of the fifth lens group GR5 disposed at the most image-side, in the direction substantially orthogonal to the optical axis.

These lenses L10, L11, and L12 form a three-element cemented lens having cemented surfaces R18 and R19, each of which is obtained by cementing a concave surface and a convex surface facing the image side and the object side, respectively, and having the same radius of curvature. The image side surface of the lens L12 is formed of an aspherical surface.

A lens L13 and a lens L14 form a cemented lens having a cemented surface R22 by cementing a concave surface and a convex surface facing the image side of the lens L13 and the object side of the lens L14, respectively, and having the same radius of curvature. The image side surface of the lens L13 is formed of an aspherical surface.

An iris IR (an iris surface R11) is arranged between the second lens group GR2 and the third lens group GR3, and the iris IR is fixed.

A filter FL (filter surfaces R24 and R25) is arranged between the fifth lens group GR5 and the image surface IMG.

The zoom lens 3 is configured to satisfy the conditional expressions (1) to (7).

Table 9 shows the lens data of a numerical example 3, to which specific numerical values are applied to the zoom lens 3 according to the third embodiment.

TABLE 9

| Ri | | Di | | Ni | | vi | |
|---|---|---|---|---|---|---|---|
| R1 | 23.585 | D1 | 0.172 | N1 | 1.847 | v1 | 23.8 |
| R2 | 4.856 | D2 | 0.610 | N2 | 1.697 | v2 | 55.5 |
| R3 | −23.380 | D3 | 0.029 | | | | |
| R4 | 4.561 | D4 | 0.377 | N3 | 1.883 | v3 | 40.8 |
| R5 | 14.638 | D5 | Variable | | | | |
| R6 | 14.638 | D6 | 0.114 | N4 | 1.851 | v4 | 40.1 |
| R7 | 1.537 | D7 | 0.406 | | | | |
| R8 | −1.854 | D8 | 0.146 | N5 | 1.806 | v5 | 40.7 |
| R9 | 1.704 | D9 | 0.311 | N6 | 1.923 | v6 | 20.9 |
| R10 | −13.905 | D10 | Variable | | | | |
| R11 | iris ∞ | D11 | 0.301 | | | | |
| R12 | 3.408 | D12 | 0.414 | N7 | 1.583 | v7 | 59.5 |
| R13 | −5.987 | D13 | Variable | | | | |
| R14 | 2.863 | D14 | 0.095 | N8 | 1.923 | v8 | 20.9 |
| R15 | 1.789 | D15 | 0.480 | N9 | 1.592 | v9 | 67.1 |
| R16 | −4.207 | D16 | Variable | | | | |
| R17 | −8.443 | D17 | 0.256 | N10 | 1.946 | v10 | 18.0 |
| R18 | −1.874 | D18 | 0.095 | N11 | 1.847 | v11 | 23.8 |
| R19 | 15.052 | D19 | 0.133 | N12 | 1.851 | v12 | 40.1 |
| R20 | 2.768 | D20 | 0.381 | | | | |
| R21 | 12.657 | D21 | 0.530 | N13 | 1.694 | v13 | 53.2 |
| R22 | −1.746 | D22 | 0.105 | N14 | 1.847 | v14 | 23.8 |
| R23 | −2.481 | D23 | 1.732 | | | | |
| R24 | filter ∞ | D24 | 0.313 | N15 | 1.517 | v15 | 64.2 |
| R25 | filter ∞ | D25 | | | | | |

In the zoom lens 3, the zooming from the wide-angle end state to the telephoto end state causes changes in a surface interval D5 between the first lens group GR1 and the second lens group GR2, a surface interval D10 between the second lens group GR2 and the third lens group (the aperture stop SP) GR3, a surface interval D13 between the third lens group GR3 and the fourth lens group GR4, and a surface interval D16 between the fourth lens group GR4 and the fifth lens group GR5. Table 10 shows the corresponding values when the object distance is an infinite distance in the wide-angle end state (the focal length f=1.00), the middle focal length state (the focal length f=5.58) and the telephoto end state (the focal length f=10.93) in the numerical example 3.

TABLE 10

|  | Focal Length | | |
| --- | --- | --- | --- |
|  | 1 | 5.582 | 10.933 |
| D5 | 0.133 | 2.991 | 3.788 |
| D10 | 3.889 | 1.031 | 0.234 |
| D13 | 1.037 | 0.301 | 0.923 |
| D16 | 0.172 | 0.907 | 0.283 |

In the zoom lens 3, the image side surface (R7) of the lens L4 of the second lens group GR2, both surfaces (R12 and R13) of the lens L7 of the third lens group GR3, the image side surface (R16) of the lens L9 of the fourth lens group GR4, the image side surface (R20) of the lens L12 of the fifth lens group GR5, and the object side surface (R21) of the lens L12 of the fifth lens group GR5 are each formed of aspherical surface. Table 11 shows the 4th-order, 6th-order, 8th-order, and 10th-order aspherical coefficients A4, A6, A8, and A10 in the numerical example 3.

TABLE 11

| Aspherical Coefficient | A4 | A6 | A8 | A10 |
| --- | --- | --- | --- | --- |
| R7 | 1.888E−03 | 1.104E−02 | 0.000E+00 | 0.000E+00 |
| R12 | −1.458E−02 | −1.071E−03 | −3.092E−03 | 0.000E+00 |
| R13 | −2.996E−04 | −5.510E−05 | −3.283E−03 | 0.000E+00 |
| R16 | 1.074E−02 | −2.967E−03 | 0.000E+00 | 0.000E+00 |
| R20 | −4.171E−03 | −2.220E−03 | 3.283E−03 | 0.000E+00 |
| R21 | −2.057E−02 | −4.921E−03 | 3.972E−03 | 0.000E+00 |

Table 12 shows the individual values of the above-mentioned conditional expressions (1) to (7) in the zoom lens 3, namely, the focal length (fi) of the individual lens groups GRi (i is 1 to 5), the focal length (f51) of the fixed group GR5-1 of the fifth lens group, the focal length (f52) of the movable group GR5-2 of the fifth lens group, the focal length (fw) of the entire lens system in the wide-angle end, the focal length (ft) of the entire lens system in the telephoto end, the focal length (fm) of the middle lens in the three-element cemented lens in the fifth lens group, the Abbe number (νm) of the middle lens in the three-element cemented lens of the fifth lens group, the focal length (fs) of the three-element cemented lens of the fifth lens group, the full aperture F value (Fno.), the angle of view (2ω) and the refractive power ratio (|f51/f52|, fw/f52, and ft/f52).

TABLE 12

| |f51/f52| | 0.82 |
| --- | --- |
| fw/f52 | 0.31 |
| ft/f52 | 3.34 |
| fm | −1.94 |
| νm | 23.78 |
| fs | −2.68 |
| f1 | 5.88 |
| f2 | −1.20 |
| f3 | 3.77 |
| f4 | 3.67 |
| f5 | 52.96 |
| f51 | −2.68 |
| f52 | 3.28 |
| fw | 1.00 |
| ft | 10.93 |

TABLE 12-continued

| Fno. | 1.85 to 3.18 |
| --- | --- |
| 2ω | 62.3° to 5.8° |

Figure 10:
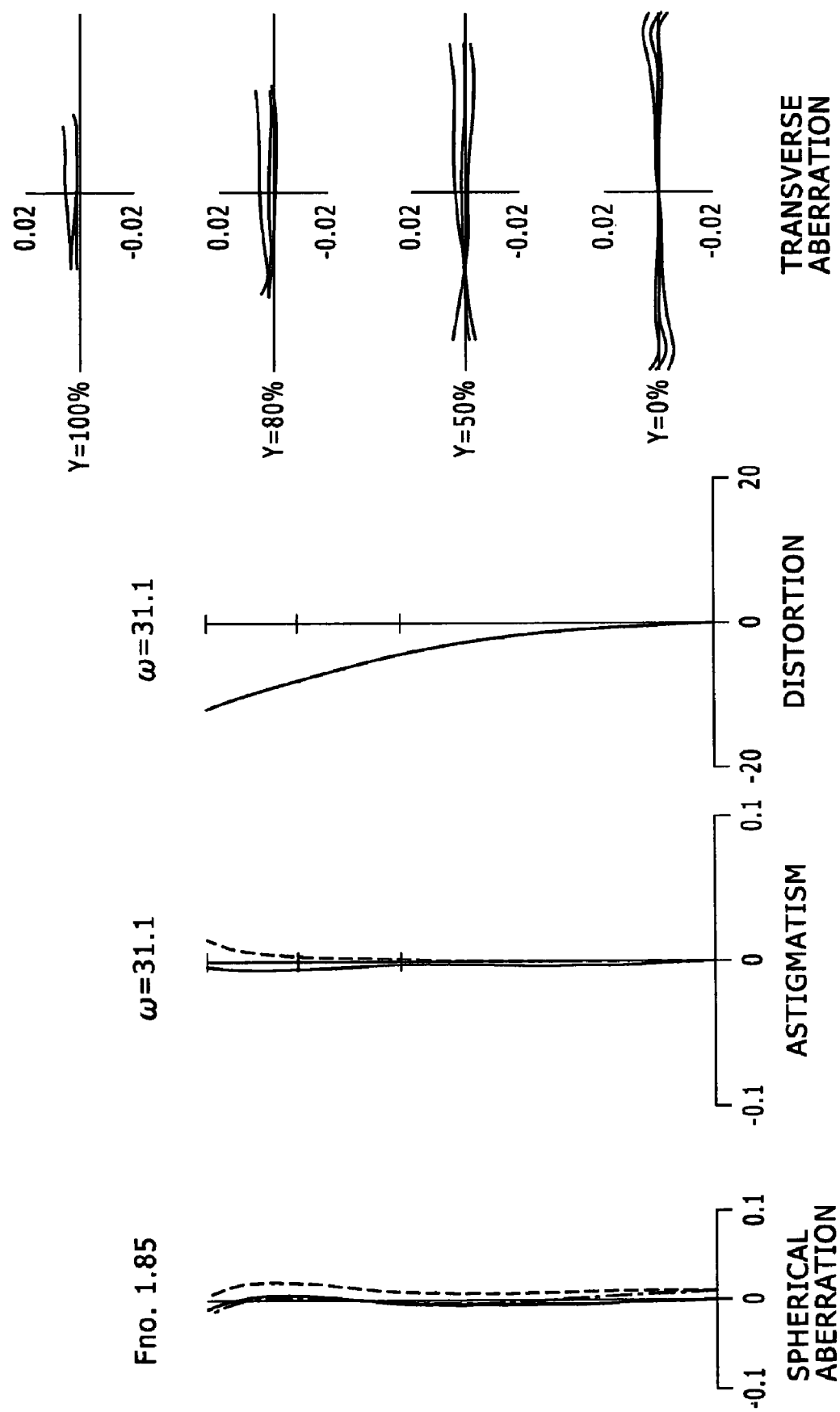
FIG. 10 shows, together with FIGS. 11 and 12, aberration diagrams as a numerical example, to which specific numerical values are applied to the third embodiment, particularly showing the spherical aberration, astigmatism, distortion, and transverse aberration in a wide-angle end state.
Figure 11:
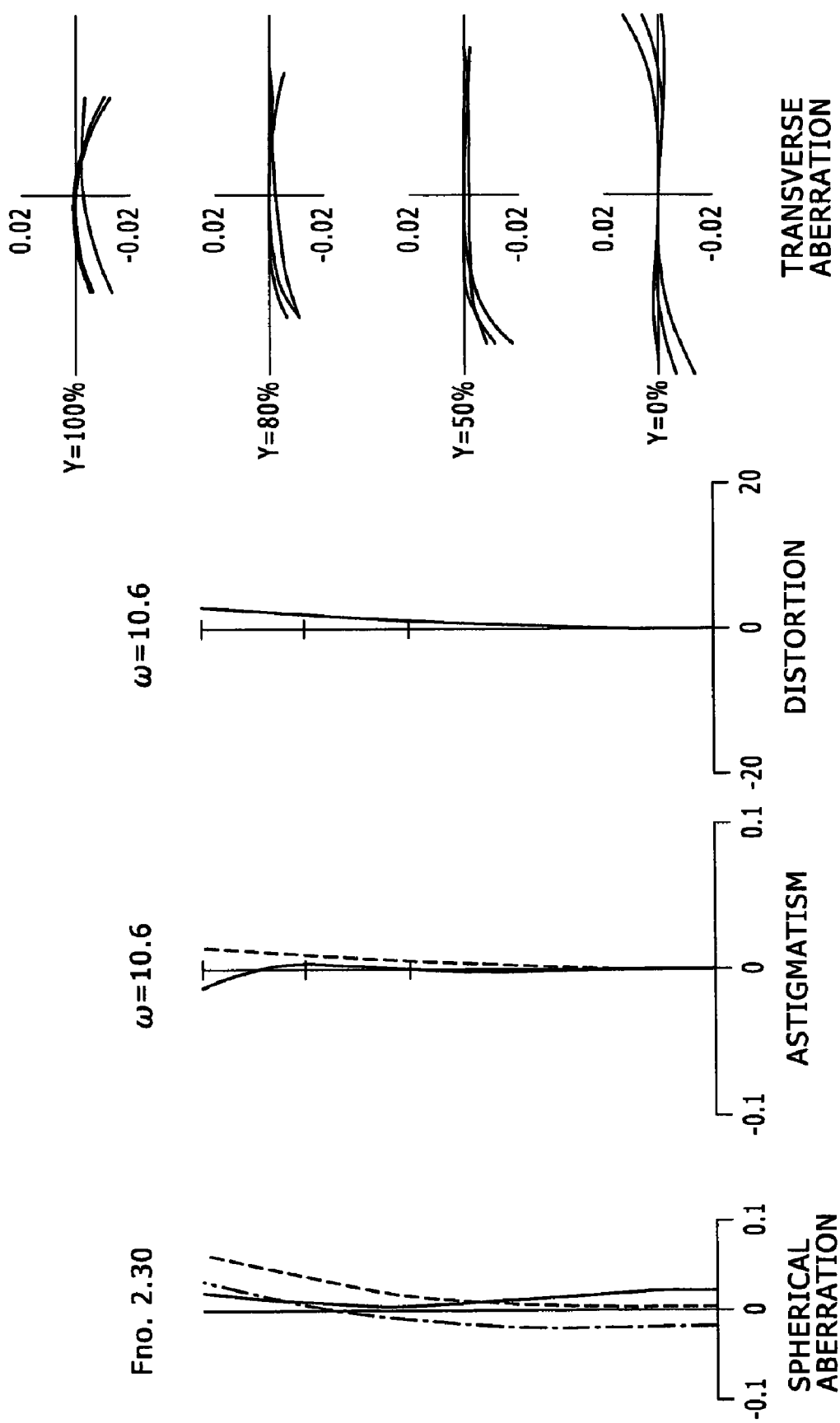
FIG. 11 shows the spherical aberration, astigmatism, distortion, and transverse aberration in a middle focal length state.
Figure 12:
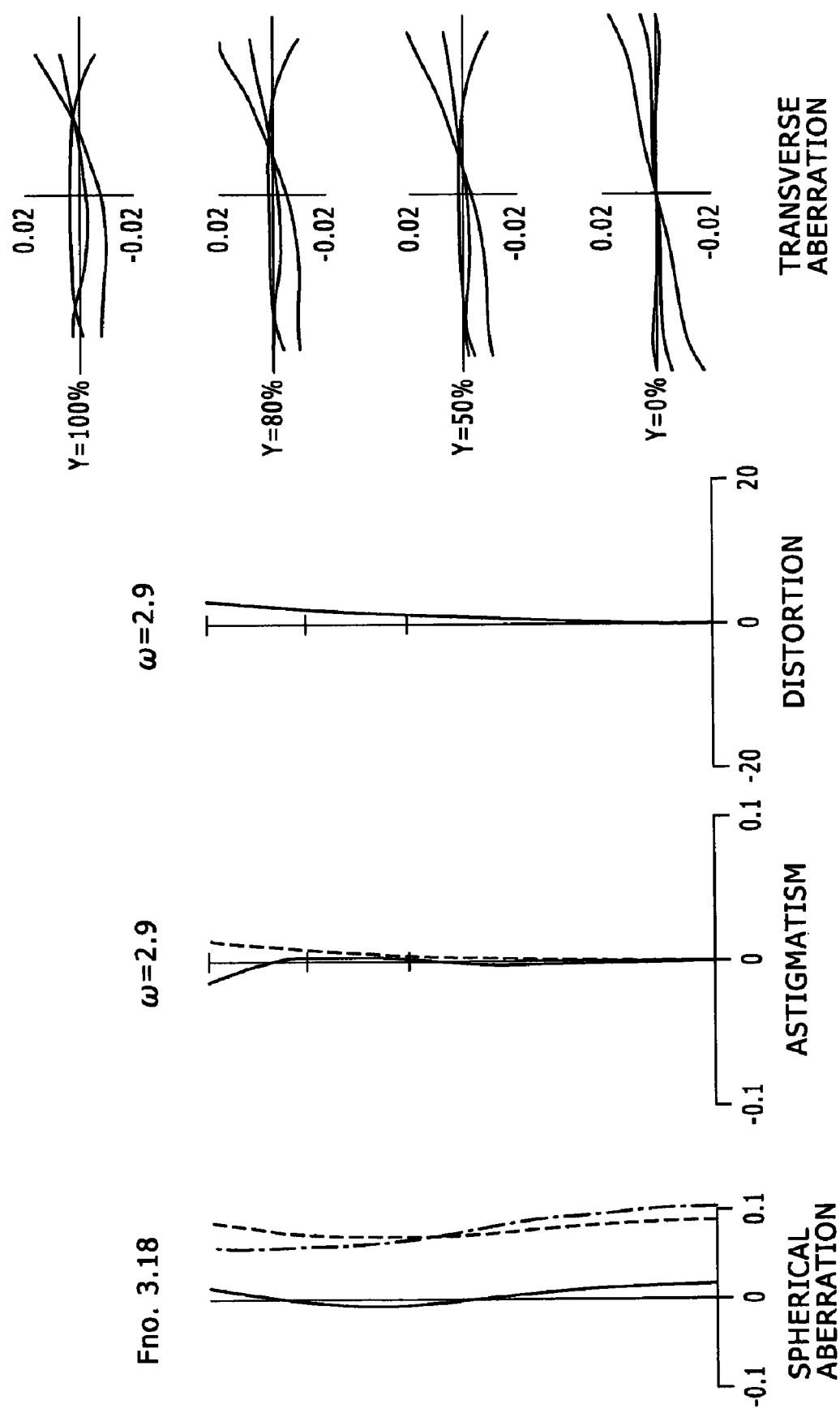
FIG. 12 shows the spherical aberration, astigmatism, distortion, and transverse aberration in a telephoto end state.

FIGS. 10 to 12 show various aberration diagrams when the numerical example 3 is brought into the infinite distance. Specifically, FIGS. 10 to 12 show the various aberration diagrams under a wide-angle end state, a middle focal length state, and a telephoto end state, respectively.

In the spherical aberration diagrams shown in FIGS. 10 to 12, the solid line represents the values of d line (wavelength of 587.6 nm), the dotted line represents the values of g line (wavelength of 435.8 nm) and the chain line represents the values of C line (wavelength of 656.3 nm). In the astigmatism diagrams shown in FIGS. 10 to 12, the solid line represents the values of a sagittal image surface, and the broken line represents the values of a meridional image surface.

It will be clear from these aberration diagrams that the numerical example 3 enables suitable corrections of the various aberrations and has excellent image forming performance.

Next, the image pickup apparatus of the invention will be described below.

The image pickup apparatus according to an embodiment of the present invention includes a zoom lens and an image pickup element for converting an optical image formed by the zoom lens into electrical signals.

The zoom lens of the image pickup apparatus includes, in order from an object side to an image side, a first lens group having a positive refractive power and being fixed, a second lens group having a negative refractive power and being movable in an optical axis direction to perform at least zooming, a third lens group having a positive refractive power and being fixed, a fourth lens group having a positive refractive power and being movable in the optical axis direction to perform focal position correction and focusing by performing a zooming, and a fifth lens group having a positive refractive power. The fifth lens group includes a fixed group having a negative refractive power being fixed, and a movable group having a positive refractive power and being movable in a direction substantially orthogonal to the optical axis. The fixed group and the movable group are arranged in the order from the object side to the image side. The image formed on an image surface is movable in a direction substantially orthogonal to the optical axis by moving the movable group of the fifth lens group in the direction substantially orthogonal to the optical axis.

Thus, in the image pickup apparatus according to the embodiment, the movable group of the fifth lens group disposed at the most image-side is used for camera-shake correction, and therefore the lens group for camera-shake correction is disposed at a location having a relatively small effective diameter of light flux, thereby enabling to avoid an increase in the size of the image pickup apparatus.

Since the movable group of the fifth lens group is disposed the most image-side, the influence due to fluctuation in light flux position in the other lens groups at the time of camera-shake correction can be minimized to avoid the increase in the size of the image pickup apparatus.

Further, less limitation is imposed on the space ensured on both sides in the optical axis direction of the movable group of the fifth lens group, thereby making it possible to improve optical performance and reduce the size of the image pickup apparatus.

The first lens group has a positive refractive power as a whole, and is formed by three lenses. The two lenses positioned near the object side form a cemented lens.

The second lens group has a negative refractive power as a whole, and is formed by three lenses. The second lens group is movable in the optical axis direction, and functions to mainly perform a zooming. The two lenses positioned near the image side form a cemented lens. The concave surface of the lens of the second lens group positioned near the object side is formed of an aspherical surface.

The third lens group is formed by a single lens having a positive refractive power. The lens of the third lens group is a meniscus lens having a convex surface facing the object side, and both of the object side surface and the image side surface are formed of aspherical surface.

The fourth lens group has a positive refractive power as a whole, and is formed by two lenses. The fourth lens group is movable in the optical axis direction, and has functions of performing focal position correction and focusing by performing a zooming. These two lenses of the fourth lens group form a cemented lens. The image side surface of the lens of the fourth lens group positioned at the image side is formed of an aspherical surface.

The fifth lens group has a positive refractive power as a whole, and is formed by five lenses. The fifth lens group has a fixed group formed by three lenses and a movable group formed by two lenses. The fixed group is fixed in position and has a negative refractive power. The movable group has a positive refractive power and being movable in a direction substantially orthogonal to the optical axis. The fixed group and the movable group are arranged in the order from the object side to the image side.

In the image pickup apparatus thus configured, the zoom lens is configured to satisfy the following conditional expressions (1) and (2).

$$0.6 < |f51/f52| < 1.0 \quad (1)$$

$$0.2 < fw/f52 < 0.5 \quad (2)$$

where f51 is the focal length of the fixed group of the fifth lens group, f52 is the focal length of the movable group of the fifth lens group, and fw is the focal length of the entire lens system at a wide-angle end.

The image pickup apparatus according to the embodiment satisfying the conditional expressions (1) and (2) is capable of reducing the size of the lens barrel and preventing resolution degradation by improving the optical performance at the time of camera-shake correction, optimalizing aberration correction, and reducing the entire length of the entire zoom lens system.

Further, by properly setting the configuration of the individual lenses of the zoom lens and the like as well as the individual conditional expressions in the image pickup apparatus of the embodiment, even when the movable group for correction is moved at the time of camera-shake correction, it becomes possible to suppress the degradation of optical performance, thereby providing the small-sized high image quality and high zoom ratio image pickup apparatus.

Alternatively, the image pickup apparatus according to the embodiment may be configured so that the three-element-element cemented lens of the fifth lens group satisfies the following conditional expressions (5) and (6).

$$fm < 0 \quad (5)$$

$$vm < 30 \quad (6)$$

where fm is the focal length of a middle lens in the three-element cemented lens, and vm is the Abbe number of the middle lens of the three-element cemented lens.

The image pickup apparatus according to the embodiment satisfying the conditional expressions (5) and (6) is capable of suitably correcting the various aberrations such as spherical aberration and comatic aberration, and also suppressing the occurrence of chromatic aberration, thereby achieving image quality improvement.

Figure 13:
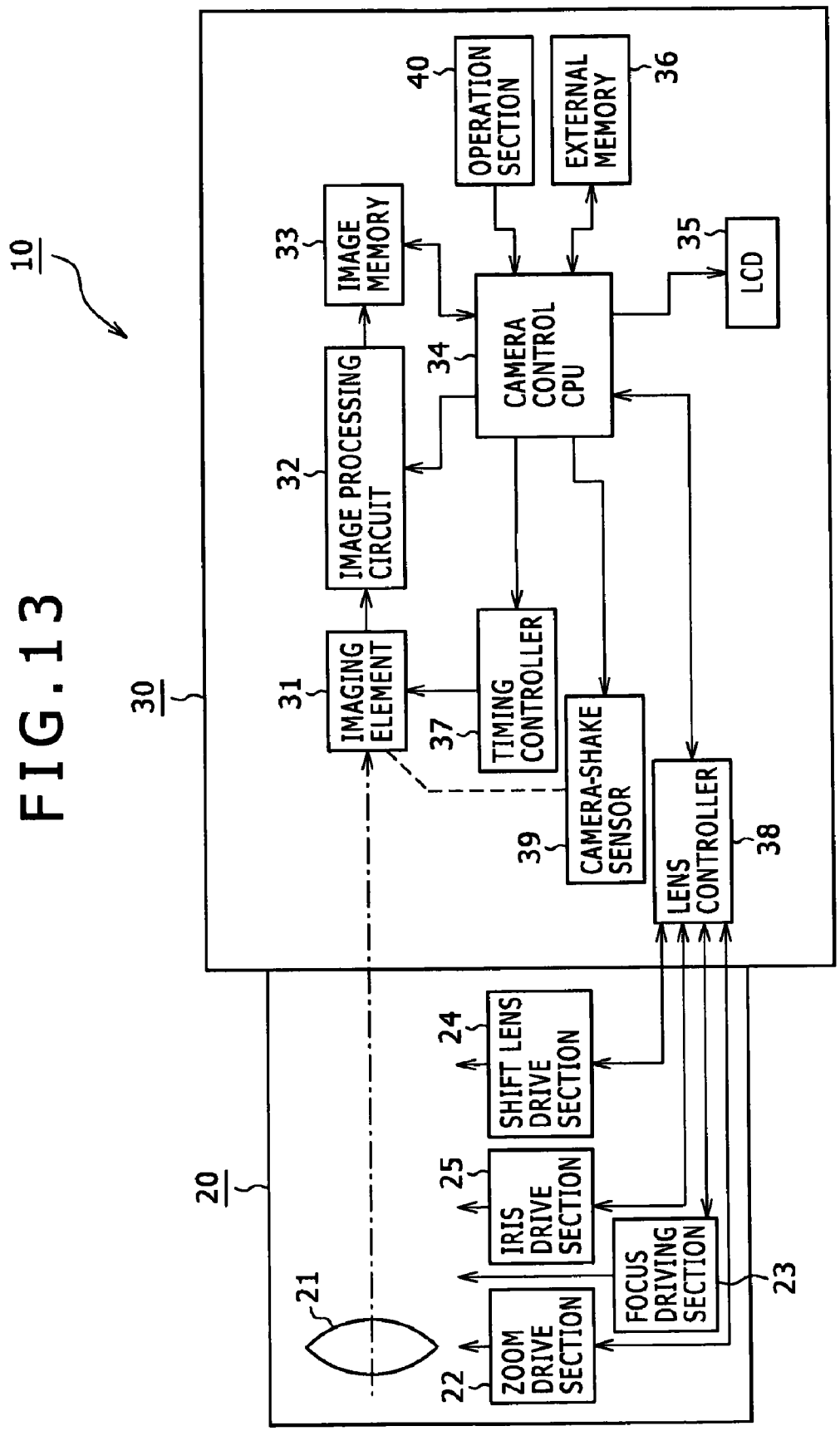
FIG. 13 is a block diagram showing an image pickup apparatus according to an embodiment of the present invention.

FIG. 13 is the block diagram of a digital still camera which is an embodiment of the image pickup apparatus according to an embodiment of the present invention.

An image pickup apparatus (digital still camera) 10 includes a lens section 20 which optically captures a subject image, and a camera main body section 30 which converts the optical image of the subject captured by the lens section 20 to electrical image signals, and applies various processings to the converted electrical image signals and also controls the lens section 20.

The lens section 20 includes a zoom lens 21 constructed from optical elements such as a lens and a filter, a zoom drive section 22 for moving a zooming group at the time of zooming, a focus driving section 23 for moving a focus group, a shift lens drive section 24 for shifting the shift lens group in a direction having a component perpendicular to the optical axis, and an iris drive section 25 for controlling the openness of the aperture stop.

As the zoom lens section 20, any one of the zoom lenses 1 to 3, or the zoom lenses of the corresponding numerical examples 1 to 3 may be used.

The camera main body section 30 includes an image pickup element 31 for converting the optical image formed by the zoom lens 21 into electrical signals.

For example, a charge coupled device (CCD) or a complementary metal-oxide semiconductor (CMOS) may be used as the image pickup element 31. The electrical image signals outputted from the imaging element 31 are subjected to various processings and then data compression in a predetermined mode by the image processing circuit 32, and thereafter the processed data is temporarily stored in an image memory 33 as an image data.

A camera control CPU (central processing unit) 34 has a function of performing the overall control of the camera main body section 30 and the lens section 20. The camera control CPU 34 reads the image data temporarily stored in the image memory 33 and displays them on a liquid crystal display (LCD) 35 and stores them in an external memory 36. The camera control CPU 34 also reads the image data stored in the external memory 36 and displays them on the liquid crystal display 35.

When an operation section 40 such as a shutter release switch, a zooming switch or the like is operated, the signal corresponding to the operation is then inputted to the camera control CPU 34, and the individual components are controlled on the basis of the signal inputted by the camera control CPU 34. For example, when the shutter release switch is operated, the camera control CPU 34 transmits an instruction signal to a timing controller 37, and the light beam from the zoom lens 21 is inputted to the image pickup element 31, and the timing controller 37 controls the signal read timing of the image pickup element 31.

Signals related to the control of the zoom lens 21, such as an auto focus (AF) signal, an auto exposure (AE) signal and a zooming signal are transmitted from the camera control CPU 34 to the lens controller 38. The lens controller 38 controls a zoom drive section 22, a focus driving section 23 and an iris drive section 25 so as to transit the zoom lens 21 into a predetermined state.

The image pickup apparatus 10 includes a camera-shake sensor 39 to detect camera-shake caused by the vibration of the image pickup element 31. When the camera-shake sensor 39 detects camera-shake, a detection signal thereof is inputted to the camera control CPU 34, and a correction signal is generated by the camera control CPU 34, and the correction signal is transmitted through the lens controller 38 to the shift lens drive section 24 of the camera section 20. When the correction signal is inputted to the shift lens drive section 24, based on the inputted correction signal, the shift lens drive section 24 shifts the shift lens (the 5b lens group of the fifth lens group 5L) in a direction to cancel the image displacement in the image pickup element 31 due to the camera-shake.

Although the foregoing embodiments have described the cases where the image pickup apparatus according to the invention is applied to the digital still camera, the image pickup apparatus is also applicable to digital video cameras.

It should be understood that the shapes, the structure and the numerical values described in the foregoing embodiments are for purposes of illustration of mere embodiments for practicing the invention and are not be construed as limiting the technical scope of the invention.

What is claimed is:

1. A zoom lens comprising, in order from an object side to an image side:
    a first lens group having a positive refractive power and including lens components which fixed to each other;
    a second lens group having a negative refractive power and being movable in an optical axis direction to perform at least a zooming;
    a third lens group having a positive refractive power and including lens components which are fixed to each other;
    a fourth lens group having a positive refractive power and being movable in the optical axis direction to perform focal position correction and focusing by performing a zooming; and
    a fifth lens group having a positive refractive power,
    wherein:
    the fifth lens group includes a three-element cemented lens having a negative refractive power and a lens group having a positive refractive power, and
    the zoom lens is configured to satisfy the following conditional expressions (5) and (6):

$$fm<0 \quad (5)$$

$$vm<30 \quad (6)$$

where fm is the focal length of a middle lens in the three-element cemented lens, and vm is the Abbe number of the middle lens of the three-element cemented lens.

2. The zoom lens according to claim 1, wherein the three-element cemented lens is formed by a first lens having a positive refractive power, a second lens having a negative refractive lens and a third lens having a negative refractive power arranged in the order mentioned from the object side to the image side.

3. The zoom lens according to claim 1, wherein at least one surface of the three-element cemented lens is formed of an aspherical surface.

4. An image pickup apparatus including a zoom lens and an image pickup element for converting an optical image formed by the zoom lens into electrical signals, the image pickup apparatus comprising:
    the zoom lens having a first lens group having a positive refractive power and including lens components which are fixed to each other, a second lens group having a negative refractive power and being movable in an optical axis direction to perform at least zooming, a third lens group having a positive refractive power and lens components which are fixed to each other, a fourth lens group having a positive refractive power and being movable in the optical axis direction to perform focal position correction and focusing by performing a zooming, and a fifth lens group having a positive refractive power, the first to the fifth lens groups being arranged in the order from an object side to an image side,
    wherein:
    the fifth lens group includes a three-element cemented lens having a negative refractive power and a lens group having a positive refractive power, and
    the zoom lens is configured to satisfy the following conditional expressions (5) and (6):

$$fm<0 \quad (5)$$

$$vm<30 \quad (6)$$

where fm is the focal length of a middle lens in the three-element cemented lens, and vm is the Abbe number of the middle lens of the three-element cemented lens.

* * * * *